(12) United States Patent
Sotani et al.

(10) Patent No.: US 7,966,902 B2
(45) Date of Patent: *Jun. 28, 2011

(54) VEHICULAR TRANSMISSION

(75) Inventors: Hiroshi Sotani, Saitama (JP); Kinya Mizuno, Saitama (JP); Seiji Hamaoka, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 857 days.

This patent is subject to a terminal disclaimer.

(21) Appl. No.: 11/902,903

(22) Filed: Sep. 26, 2007

(65) Prior Publication Data

US 2008/0081725 A1 Apr. 3, 2008

(30) Foreign Application Priority Data

Sep. 29, 2006 (JP) ................. 2006-270040

(51) Int. Cl.
*F16H 59/00* (2006.01)

(52) U.S. Cl. ........................ 74/335; 74/337.5
(58) Field of Classification Search .......... None
See application file for complete search history.

(56) References Cited

U.S. PATENT DOCUMENTS

| 4,491,031 | A  | * | 1/1985 | Ooka | 74/337.5 |
| 7,677,124 | B2 | * | 3/2010 | Honma | 74/337.5 |
| 7,752,936 | B2 | * | 7/2010 | Kobayashi et al. | 74/337.5 |
| 7,753,187 | B2 | * | 7/2010 | Fujimoto et al. | 192/219.5 |

FOREIGN PATENT DOCUMENTS

JP 59-106014 A 6/1984

* cited by examiner

*Primary Examiner* — Justin Holmes
(74) *Attorney, Agent, or Firm* — Birch, Stewart, Kolasch & Birch, LLP

(57) ABSTRACT

A vehicular transmission includes a shift drum center with a plurality of gear train establishment notches disposed, equally spaced apart from each other, on the outer periphery thereof. The gear train establishment notches establish a specific gear train selected from among a plurality of gear trains by selectively engaging a drum stopper arm therein. The shift drum center further includes half neutral notches to be engaged with the drum stopper arm. The half neutral notches are disposed on the outer periphery of the shift drum center and at a central portion between each pair of the gear train establishment notches, respectively. The resulting configuration effectively suppresses an engagement noise during changing of a gear position through a sliding motion of a shifter.

20 Claims, 16 Drawing Sheets

VEHICULAR TRANSMISSION

CROSS-REFERENCE TO RELATED APPLICATION

The present application claims priority under 35 U.S.C. §119 to Japanese Patent Application No. 2006-270040, filed Sep. 29, 2006, the entire contents of which are hereby incorporated by reference.

BACKGROUND OF THE INVENTION

1. Field of the Invention

The present invention relates to a vehicular transmission including a main shaft, a countershaft, gear trains of a plurality of gear positions, a shift drum, a shift drum center, a drum stopper arm, and an intermittent feed mechanism. Specifically, the main shaft can receive power transmitted from an engine. The countershaft is connected to a drive wheel. The gear trains of the plurality of gear positions are disposed between the main shaft and the countershaft, allowing the plurality of gear positions to be selectively established. The shift drum has a lead groove formed on an outer periphery thereof for selecting an established state of the gear trains of the plurality of gear positions. The shift drum center rotates with the shift drum. The drum stopper arm engages in an outer periphery of the shift drum center and is urged toward a center of rotation of the shift drum center in order to determine a position of rotation of the shift drum center. The intermittent feed mechanism rotatably drives the shift drum center intermittently. The transmission shuts down power transmission from the engine to the main shaft when the established state of the gear trains is selected.

2. Description of Background Art

A known vehicular transmission, as disclosed, for example, in Japanese Patent Laid-open No. Sho 59-106014, selects the established state of the gear trains of a plurality of gear positions by rotatably driving intermittently a shift drum center that rotates with a shift drum.

The vehicular transmission disclosed in Japanese Patent Laid-open No. Sho 59-106014 includes notches disposed on an outer periphery of the shift drum center. The notches are equally spaced apart from each other in a circumferential direction of the shift drum center, each corresponding individually to each of the plurality of gear positions. An intermittent feed mechanism included in this transmission rotatably drives the shift drum center intermittently by only an angle corresponding to the distance between two adjacent notches. Consequently, when the established state of the gear trains of the plurality of gear positions is selected, a large engagement noise results because of a relatively large difference in speed between the shifter and a gear to be engaged with the shifter. This is particularly conspicuous in a vehicle arranged to select automatically a gear position according to an upshift or downshift operation and arranged to make a preliminary gearshift during running at a given gear position. Specifically, in such a vehicle, there is produced a large engagement noise that is not operatively associated with an operation performed by an occupant of the vehicle. This gives the occupant a sense of discomfort.

The present invention has been made to address the foregoing situation and it is an object of the present invention to provide a vehicular transmission that can suppress the engagement noise produced when the shifter is moved slidably to select a gear position.

SUMMARY AND OBJECTS OF THE INVENTION

To achieve the foregoing object, a first aspect of the present invention provides a vehicular transmission. The transmission includes main shafts, a countershaft, gear trains of a plurality of gear positions, shifters, a shift drum, a shift drum center, a drum stopper arm, and an intermittent feed mechanism. Specifically, the main shafts are to receive power drive transmitted from an engine. The countershaft is connected to a drive wheel. The gear trains of the plurality of gear positions are disposed, to be selectively established, between the main shafts and the countershaft. The shifters are supported unrotatably and slidably on the main shafts or the countershaft to select an established state of the gear trains. The shift drum includes lead grooves, in which shift forks rotatably holding the shifters are engaged, formed on an outer periphery thereof. The shift drum center is rotatable with the shift drum. The drum stopper arm is urged toward a center of rotation of the shift drum center so as to engage an outer periphery of the shift drum center and thereby determine a position of rotation of the shift drum center. The intermittent feed mechanism rotatably drives the shift drum center intermittently. The power drive from the engine to the main shafts is shut down when the established state of the gear trains is selected. In this transmission, the shift drum center includes a plurality of gear train establishment notches disposed on the outer periphery of the shift drum center so as to be equally spaced apart from each other. The gear train establishment notches establish a specific gear train selected from among the gear trains by selectively engaging the drum stopper arm therein. Further, the shift drum center also includes half neutral notches to be engaged with the drum stopper arm. The half neutral notches are disposed on the outer periphery of the shift drum center and at a central portion between each pair of the gear train establishment notches, respectively.

A second aspect of the present invention provides a vehicular transmission. The transmission according to the second aspect of the present invention includes first and second main shafts, a countershaft, gear trains of a plurality of gear positions, shifters, a shift drum, a shift drum center, a drum stopper arm, and an intermittent feed mechanism. Specifically, the first and second main shafts are disposed coaxially to permit transmission of power drive from an engine. The countershaft is connected to a drive wheel. The gear trains of the plurality of gear positions are disposed, to be selectively established, between the first and second main shafts and the countershaft. The shifters are supported unrotatably and slidably on the first main shaft to select an established state of specific gear trains disposed between the first main shaft and the countershaft out of the gear trains of the plurality of gear positions. The shift drum includes lead grooves, in which shift forks rotatably holding the shifters are engaged, formed on an outer periphery thereof. The shift drum center is rotatable with the shift drum. The drum stopper arm is urged toward a center of rotation of the shift drum center so as to engage an outer periphery of the shift drum center and thereby determine a position of rotation of the shift drum center. The intermittent feed mechanism rotatably drives the shift drum center intermittently. The power drive from the engine to the first main shaft is shut down with the power drive from the engine to the second main shaft transmitted when the established state of the specific gear trains disposed between the first main shaft and the countershaft is selected. In this transmission, the shift drum center includes a plurality of gear train establishment notches disposed on the outer periphery of the shift drum center so as to be equally spaced apart from each other. The gear train establishment notches establish a specific gear train selected from among the gear trains disposed between the first main shaft and the countershaft. Further, the shift drum center also includes half neutral notches to be engaged with the drum stopper arm. The half neutral notches are disposed on the outer periphery of the shift drum center and at a central portion between each pair of the gear train establishment notches, respectively.

A third aspect of the present invention provides a vehicular transmission. The transmission according to the third aspect of the present invention includes first and second main shafts, a countershaft, gear trains of a plurality of gear positions, a shifter, a shift drum, a shift drum center, a drum stopper arm, and an intermittent feed mechanism. Specifically, the first and second main shafts are disposed coaxially to permit transmission of power drive from an engine. The countershaft is connected to a drive wheel. The gear trains of the plurality of gear positions are disposed, to be selectively established, between the first and second main shafts and the countershaft. The shifter is supported unrotatably and slidably on the countershaft to select an established state of specific gear trains disposed between the second main shaft and the countershaft out of the gear trains of the plurality of gear positions. The shift drum includes a lead groove, in which a shift fork rotatably holding the shifter is engaged, formed on an outer periphery thereof. The shift drum center is rotatable with the shift drum. The drum stopper arm is urged toward a center of rotation of the shift drum center so as to engage an outer periphery of the shift drum center and thereby determine a position of rotation of the shift drum center. The intermittent feed mechanism rotatably drives the shift drum center intermittently. The power drive from the engine to the second main shaft is shut down with the power drive from the engine to the first main shaft transmitted, when the established state of the specific gear trains disposed between the second main shaft and the countershaft is selected. In this transmission, the shift drum center includes a plurality of gear train establishment notches disposed on the outer periphery of the shift drum center so as to be equally spaced apart from each other. The gear train establishment notches establish a specific gear train selected from among the gear trains disposed between the second main shaft and the countershaft. Further, the shift drum center also includes a half neutral notch to be engaged with the drum stopper arm. The half neutral notch is disposed on the outer periphery of the shift drum center and at a central portion between the gear train establishment notches.

In accordance with a fourth aspect of the present invention, in addition to the arrangement of any of the first to third aspects of the present invention, the gear train establishment notches are each formed into a V-shaped recess and the half neutral notches are each formed into an arcuate recess.

Effects of the present invention include the following:

In accordance with the first aspect of the present invention, when the shifters rotated with the main shafts or the countershaft are slidably moved in order to select the established state of the gear trains, the drum stopper arm engages the half neutral notch, so that rotational resistance acting on the shift drum center can be temporarily increased and the rotational speed can thereby be temporarily reduced. This allows timing of the shifter engaging the gear train to be established to be retarded. The difference in speed between the shifter and the gears to be engaged with the shifter can thereby be made relatively small, so that the engagement noise can be prevented from becoming large.

In accordance with the second aspect of the present invention, when the shifters rotated with the first main shaft are slidably moved in order to select the established state of the gear trains in a condition, in which the power drive from the engine to the first main shaft is shut down with the power drive from the engine to the second main shaft transmitted, the drum stopper arm engages the half neutral notch, so that the rotational resistance acting on the shift drum center can be temporarily increased and the rotational speed can thereby be temporarily reduced. This allows timing of the shifter engaging the gear train to be established to be retarded. Accordingly, in a condition in which both idle gears are rotating as a result of establishment of the gear train disposed between the second main shaft and the countershaft, a difference in speed between the shifter and relative rotation of the gears with which the shifter is engaged, which occurs as the first main shaft is rotated together because of the bearings disposed between the first and second main shaft or viscosity of lubricant packed, can be made relatively small. Accordingly, the engagement noise can be prevented from becoming large.

In accordance with the third aspect of the present invention, when the shifter rotated with the countershaft is slidably moved in order to select the established state of the gear trains in a condition, in which the power drive from the engine to the second main shaft is shut down with the power drive from the engine to the first main shaft transmitted, the drum stopper arm engages the half neutral notch, so that the rotational resistance acting on the shift drum center can be temporarily increased and the rotational speed can thereby be temporarily reduced. This allows timing of the shifter engaging the gear train to be established to be retarded. Accordingly, in a condition in which the countershaft and the shifter are rotating as a result of establishment of the gear train disposed between the first main shaft and the countershaft, gears of the gear train to be established are also rotated as the second main shaft is rotated together because of the bearings disposed between the first and second main shaft or viscosity of lubricant packed. A difference in speed between these gears and a relative rotational speed of the shifter can be made relatively small. Accordingly, the engagement noise can be prevented from becoming large.

In accordance with the fourth aspect of the present invention, the drum stopper arm can be quickly engaged with, or disengaged from, the gear train establishment notch and can be maintained in the engaged state with the half neutral notch for a relatively longer period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
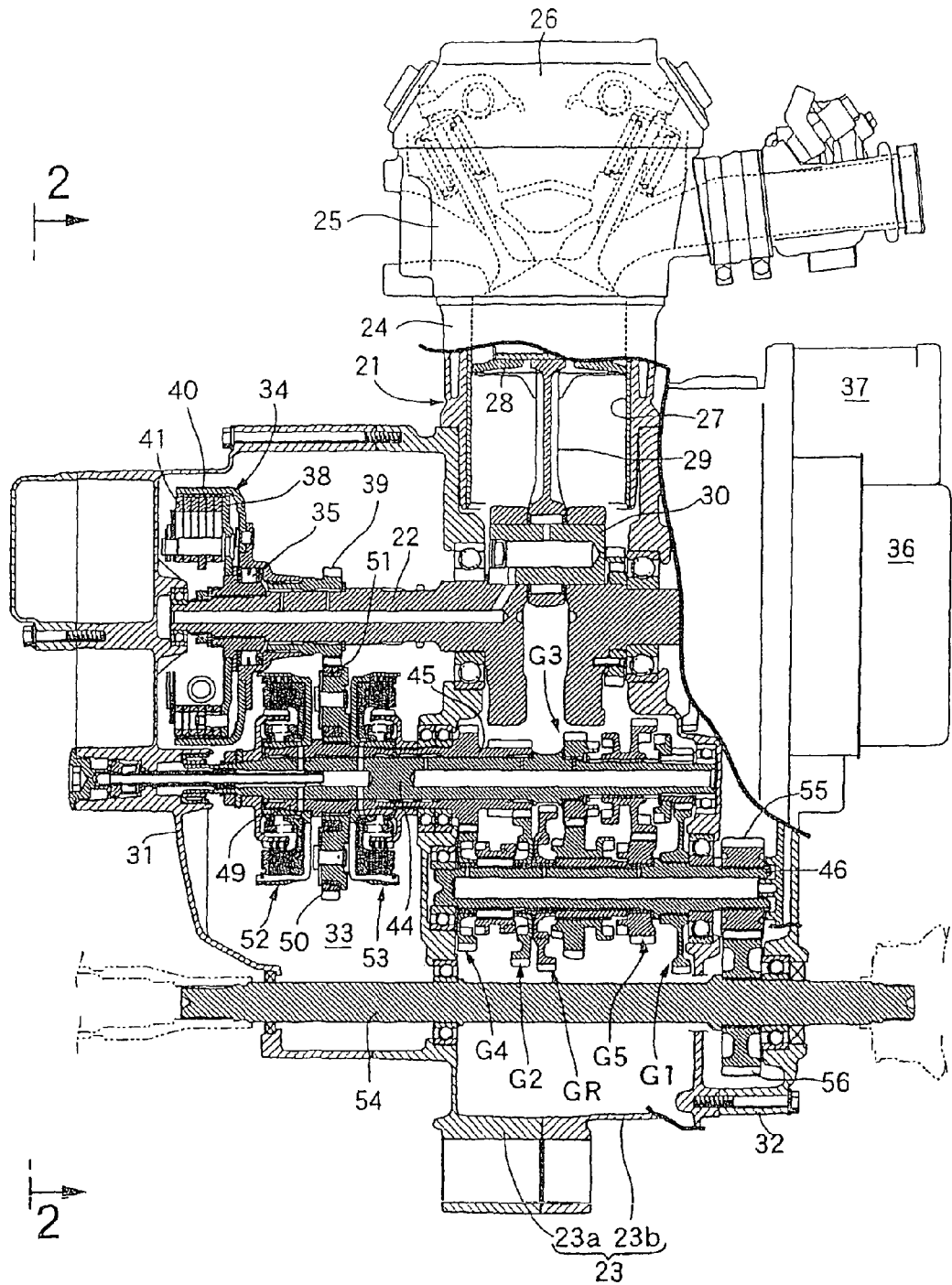
FIG. 1 is a longitudinal cross-sectional view showing an engine main body, taken along line 1-1 of FIG. 2.

FIGS. 1-19 are views showing a first aspect of the present invention. Referring first to FIG. 1, an engine main body 21 of an engine E mounted in, for example, an off-road vehicle, includes a crankcase 23, a cylinder block 24, a cylinder head 25, and a head cover 26. Specifically, the crankcase 23 rotatably supports a crankshaft 22 having an axis extending in a vehicle width direction (parallel with a paper surface of FIG. 1). The cylinder block 24 is connected to an upper portion of the crankcase 23. The cylinder head 25 is connected to an upper portion of the cylinder block 24. The head cover 26 is connected to an upper portion of the cylinder head 25. A piston 28 slidably fitted in a cylinder bore 27 of the cylinder block 24 is linked to the crankshaft 22 via a connecting rod 29 and a crankpin 30.

The crankcase 23 includes a pair of case half bodies 23a, 23b connected together by a plane orthogonal to an axis of rotation of the crankshaft 22. First and second crankcase covers 31, 32 are connected to either side of the crankcase 23. A clutch accommodation chamber 33 is formed between the crankcase 23 and the first crankcase cover 31.

The crankshaft 22 protruding from the crankcase 23 has a first end rotatably supported by the first crankcase cover 31. A centrifugal clutch 34 is mounted via a one-way clutch 35 on the first end of the crankshaft 22 at a position close to the first crankcase cover 31. The centrifugal clutch 34 is to be accommodated in the clutch accommodation chamber 33. A generator (not shown) disposed between the crankcase 23 and the second crankcase cover 32 is connected to a second end of the crankshaft 22 protruding from the crankcase 23. In addition, a recoil starter 36 mounted to the second crankcase cover 32 is connected to the second end of the crankshaft 22 protruding from the crankcase 23. Further, a starter motor 37 for inputting a starting power drive to the crankshaft 22 is also mounted on the second crankcase cover 32.

The centrifugal clutch 34 includes a drive plate 38, a clutch housing 40, and a clutch weight 41. The drive plate 38 is secured to the crankshaft 22. The clutch housing 40, of a cup shape, coaxially covers the drive plate 38 so as to be rotatable with a drive gear 39 mounted to be relatively rotatable on the crankshaft 22. The clutch weight 41 is rotatably journaled on the drive plate 38 so as to be frictionally engageable with an inner periphery of the clutch housing 40 in accordance with a centrifugal force acted thereon as a result of rotation of the crankshaft 22. The one-way clutch 35 is disposed between the clutch housing 40 and the drive plate 38 so as to enable power drive transmission from the drive gear 39 to the crankshaft 22.

Figure 2:
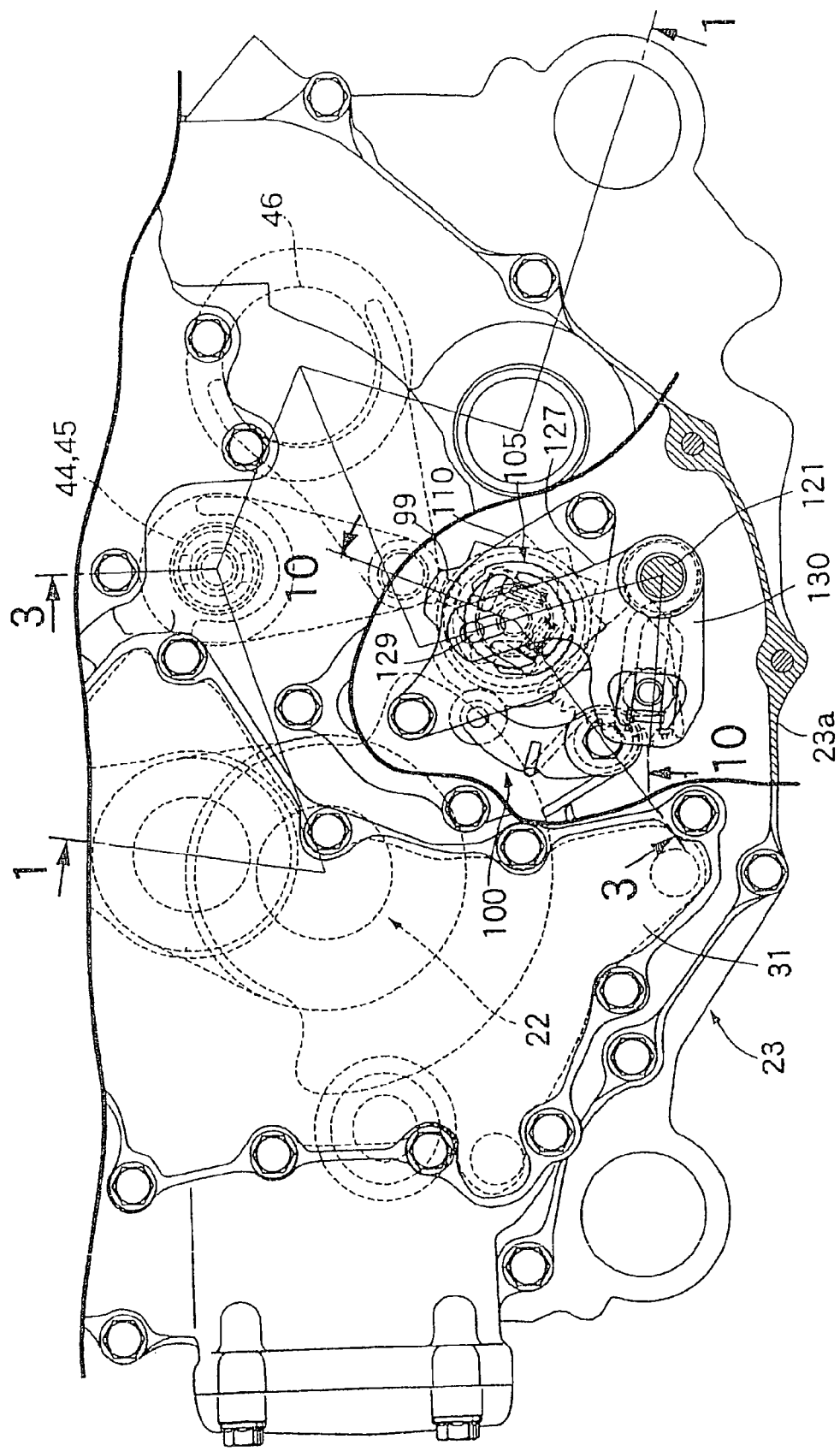
FIG. 2 is a partly cutaway side elevational view on arrow 2-2 of FIG. 1.
Figure 3:
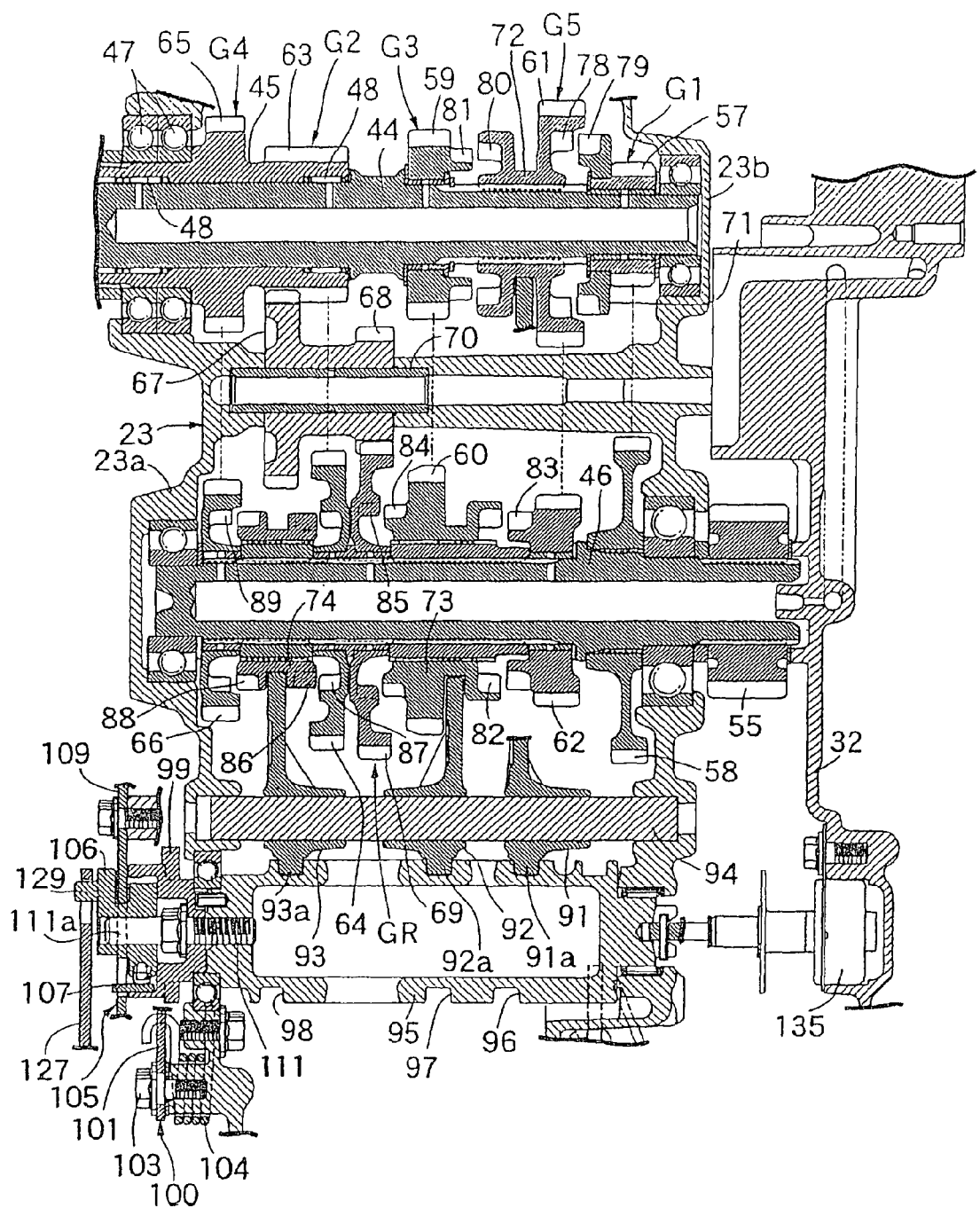
FIG. 3 is a cross-sectional view taken along line 3-3 of FIG. 2.

Referring also to FIGS. 2 and 3, first and second main shafts 44, 45 and a countershaft 46 are rotatably supported in the crankcase 23. Specifically, the first and second main shafts 44, 45, which are disposed coaxially so as to permit relative rotation about an identical axis, are rotatably supported so as to be capable of rotation about an axis that extends in parallel with the axis of rotation of the crankshaft 22. The countershaft 46 extends in parallel with the first and second main shafts 44, 45. Gear trains allowing a plurality of gear positions to be selectively established are disposed between the first and second main shafts 44, 45 and the countershaft 46. In accordance with the embodiment of the present invention, a first speed gear train G1, a third speed gear train G3, and a fifth speed gear train G5 are disposed between the first main shaft 44 and the countershaft 46. Further, a second speed gear train G2, a fourth speed gear train G4, and a reverse gear train GR are disposed between the second main shaft 45 and the countershaft 46.

The first main shaft 44 passes coaxially through the second main shaft 45 rotatably supported by the crankcase 23 via ball bearings 47, 47 so as to permit relative rotation. A plurality of needle bearings 48 . . . is disposed between the second main shaft 45 and the first main shaft 44.

A transmission tubular shaft 49 is relatively rotatably mounted on the first main shaft 44 in the clutch accommodation chamber 33. Power drive is transmitted to the transmission tubular shaft 49 via the drive gear 39 relatively rotatably mounted on the crankshaft 22, a driven gear 50 in mesh with the drive gear 39, and a rubber damper 51. A first hydraulic clutch 52 is disposed between the transmission tubular shaft 49 and the first main shaft 44. A second hydraulic clutch 53 is disposed between the transmission tubular shaft 49 and the second main shaft 45.

Accordingly, when power drive is transmitted from the crankshaft 22 to the first main shaft 44 with the first hydraulic clutch 52 in a power drive transmission state, power is transmitted from the first main shaft 44 to the countershaft 46 through a gear train alternatively established from among the first, third, and fifth speed gear trains G1, G3, G5. When power drive is transmitted from the crankshaft 22 to the second main shaft 45 with the second hydraulic clutch 53 in a power drive transmission state, on the other hand, power is transmitted from the second main shaft 45 to the countershaft 46 through a gear train alternatively established from among the second and fourth speed, and reverse gear trains G2, G4, GR.

Referring to FIG. 1, an output shaft 54 having an axis extending in parallel with the axis of rotation of the crankshaft 22 is connected to a drive wheel not shown. The output shaft 54 is rotatably supported by the case half body 23a of the case half bodies 23a, 23b forming the crankcase 23 and the second crankcase cover 32. Both ends of the output shaft 54 pass through the first and second crankcase covers 31, 32, respectively, watertightly and rotatably and protrude outwardly. A drive gear 55 is secured to an end of the countershaft 46 protruding from the case half body 23b of the case half bodies 23a, 23b forming the crankcase 23. A driven gear 56 to be in mesh with the drive gear 55 is disposed on the output shaft 54. Specifically, the countershaft 46 is connected to the drive wheel through the drive gear 55, the driven gear 56, and the output shaft 54.

Reference is now made to FIG. 3. The first speed gear train G1 includes a first speed drive idle gear 57 and a first speed driven gear 58. The first speed drive idle gear 57 is supported axially immovably but relatively rotatably on the first main shaft 44. The first speed driven gear 58 is connected relatively unrotatably to the countershaft 46 and meshes with the first speed drive idle gear 57. The third speed gear train G3 includes a third speed drive idle gear 59 and a third speed driven gear 60. The third speed drive idle gear 59 is supported axially immovably but relatively rotatably on the first main shaft 44. The third speed driven gear 60 is connected relatively unrotatably to the countershaft 46 and meshes with the third speed drive idle gear 59. The fifth speed gear train G5 includes a fifth speed drive gear 61 and a fifth speed driven idle gear 62. The fifth speed drive gear 61 is disposed axially slidably between the first and third speed drive idle gear 57, 59 and connected relatively unrotatably to the first main shaft 44. The fifth speed driven idle gear 62 is axially immovably but relatively rotatably supported on the countershaft 46 and meshes with the fifth speed drive gear 61.

The second speed gear train G2 includes a second speed drive gear 63 and a second speed driven idle gear 64. The second speed drive gear 63 is integrally formed with the second main shaft 45. The second speed driven idle gear 64 is axially immovably but relatively rotatably supported on the countershaft 46 and meshes with the second speed drive gear 63. The fourth speed gear train G4 includes a fourth speed drive gear 65 and a fourth speed driven idle gear 66. The fourth speed drive gear 65 is integrally formed with the second main shaft 45. The fourth speed driven idle gear 66 is axially immovably but relatively rotatably supported on the countershaft 46 and meshes with the fourth speed drive gear 65. The reverse gear train GR includes the second speed drive gear 63, a first reverse idle gear 67, a second reverse idle gear 68, and a reverse driven idle gear 69. The first reverse idle gear 67 meshes with the second speed drive gear 63. The second reverse idle gear 68 is integrally formed with the first reverse idle gear 67. The reverse driven idle gear 69 is axially immovably but relatively rotatably supported on the countershaft 46 and meshes with the second reverse idle gear 68. The integrally formed first and second reverse idle gears 67, 68 are rotatably supported on a reverse idle shaft 70 having an axis extending in parallel with the first main shaft 44, the second main shaft 45, and the countershaft 46 and having both ends supported in the crankcase 23.

An annular engaged member 71 is fixedly attached to an end of the first speed drive idle gear 57 on a side of the third speed drive idle gear 59. A first shifter 72 is relatively unrotatably and axially slidably supported on the first main shaft 44 between the engaged member 71 and the third speed drive idle gear 59. The fifth speed drive gear 61 is integrated with the first shifter 72. The first shifter 72 is axially slidable along the first main shaft 44. The first shifter 72 may be disposed at a position, at which the first shifter 72 engages the engaged member 71 to establish the first speed gear train G1. The first shifter 72 may be disposed at a position, at which the first shifter 72 engages the third speed drive idle gear 59 to establish the third speed gear train G3. Alternatively, the first shifter 72 may be disposed at an intermediate position (neutral position), at which the first shifter 72 engages neither the first speed drive idle gear 57 nor the third speed drive idle gear 59.

The third speed driven gear 60 of the third speed gear train G3 is integrally formed with a second shifter 73. The second shifter 73 is relatively unrotatably and axially slidably supported on the countershaft 46 between the fifth speed driven idle gear 62 and the reverse driven idle gear 69. While retaining a meshing engagement state between the third speed drive idle gear 59 and the third speed driven gear 60, the second shifter 73 is axially slidable along the countershaft 46 between a position, at which the second shifter 73 engages the fifth speed driven idle gear 62, and a position, at which the second shifter 73 engages the reverse driven idle gear 69. Accordingly, the fifth speed gear train G5 is established when the second shifter 73 engages the fifth speed driven idle gear 62 with the first shifter 72 at the intermediate position.

Additionally, a third shifter 74 is relatively unrotatably and axially slidably supported on the countershaft 46 between the second speed driven idle gear 64 and the fourth speed driven idle gear 66. The third shifter 74 is axially slidable along the countershaft 46. The third shifter 74 may be disposed at a position, at which the third shifter 74 engages the second speed driven idle gear 64 to establish the second speed gear train G2. The third shifter 74 may be disposed at a position, at which the third shifter 74 engages the fourth speed driven idle gear 66 to establish the fourth speed gear train G4. Alternatively, the third shifter 74 may be disposed at an intermediate position (neutral position), at which the third shifter 74 engages neither the second speed driven idle gear 64 nor the fourth speed driven idle gear 66. Accordingly, the reverse gear train GR is established when the second shifter 73 engages the reverse driven idle gear 69 with the first and third shifters 72, 74 are disposed at the intermediate position.

Figure 4:
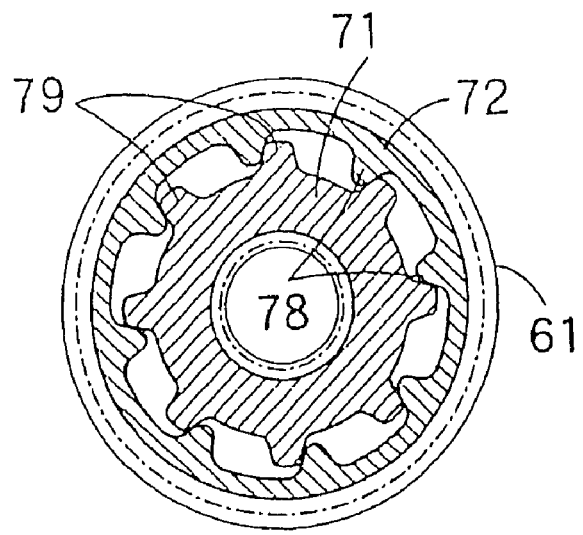
FIG. 4 is a transverse cross-sectional view showing a condition, in which a first shifter is engaged with an engaged member.
Figure 5:
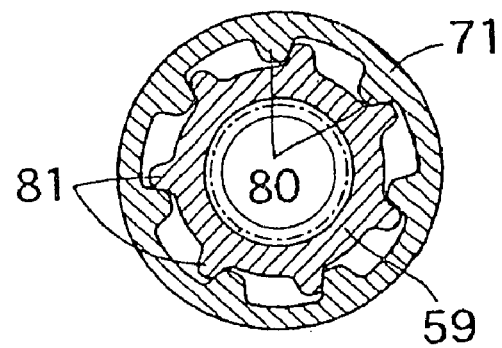
FIG. 5 is a transverse cross-sectional view showing a condition, in which the first shifter is engaged with a third speed drive idle gear.

Referring to FIG. 4, a plurality of first engagement protrusions 78 . . . is disposed, equally spaced apart from each other, circumferentially on an end of the first shifter 72 on a side of the engaged member 71 fixedly attached to the first speed drive idle gear 57. The engaged member 71 includes a plurality of first lock protrusions 79 . . . to be engaged with corresponding ones of the first engagement protrusions 78 . . . . Referring to FIG. 5, a plurality of second engagement protrusions 80 . . . is disposed, equally spaced apart from each other, circumferentially on an end of the first shifter 72 on a side of the third speed drive idle gear 59. The third speed drive idle gear 59 includes a plurality of second lock protrusions 81 . . . to be engaged with corresponding ones of the second engagement protrusions 80 . . . .

Figure 6:
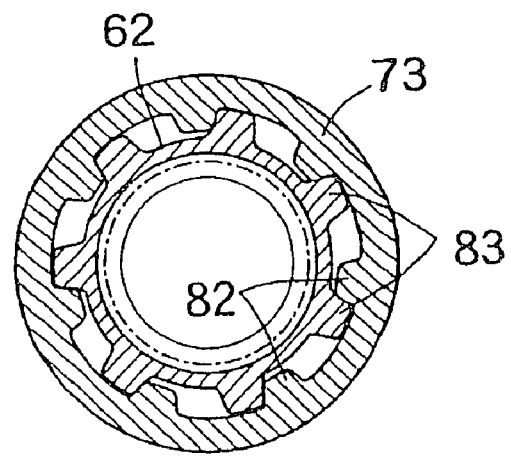
FIG. 6 is a transverse cross-sectional view showing a condition, in which a second shifter is engaged with a fifth speed driven idle gear.
Figure 7:
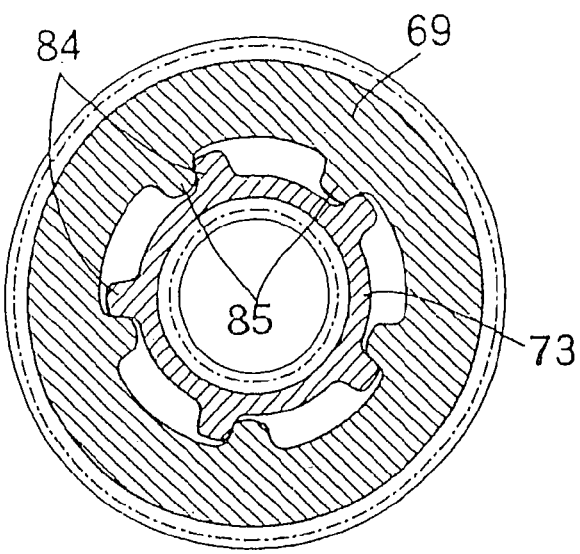
FIG. 7 is a transverse cross-sectional view showing a condition, in which the second shifter is engaged with a reverse driven idle gear.

Referring to FIG. 6, a plurality of third engagement protrusions 82 . . . is disposed, equally spaced apart from each other, circumferentially on an end of the second shifter 73 on a side of the fifth speed driven idle gear 62. The fifth speed driven idle gear 62 includes a plurality of third lock protrusions 83 . . . to be engaged with corresponding ones of the third engagement protrusions 82 . . . . Referring to FIG. 7, a plurality of fourth engagement protrusions 84 . . . is disposed, equally spaced apart from each other, circumferentially on an end of the second shifter 73 on a side of the reverse driven idle gear 69. The reverse driven idle gear 69 includes a plurality of fourth lock protrusions 85 . . . to be engaged with corresponding ones of the fourth engagement protrusions 84 . . . .

Figure 8:
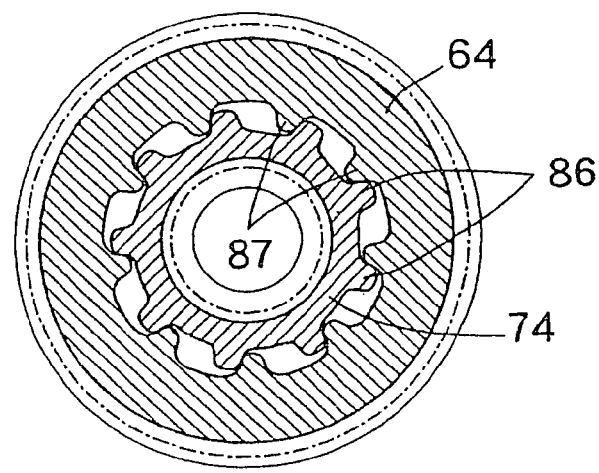
FIG. 8 is a transverse cross-sectional view showing a condition, in which a third shifter is engaged with a second speed driven idle gear.
Figure 9:
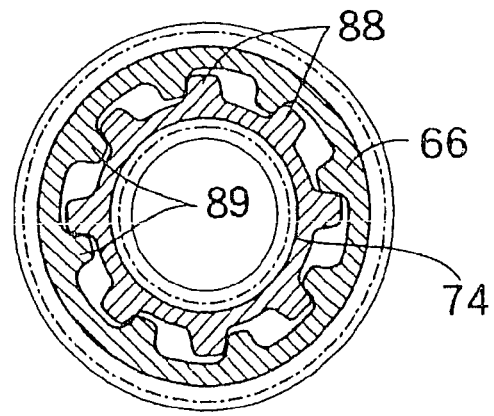
FIG. 9 is a transverse cross-sectional view showing a condition, in which the third shifter is engaged with a fourth speed driven idle gear.

Referring to FIG. 8, a plurality of fifth engagement protrusions 86 . . . is disposed, equally spaced apart from each other, circumferentially on an end of the third shifter 74 on a side of the second speed driven idle gear 64. The second speed driven idle gear 64 includes a plurality of fifth lock protrusions 87 . . . to be engaged with corresponding ones of the fifth engagement protrusions 86 . . . . Referring to FIG. 9, a plurality of sixth engagement protrusions 88 . . . is disposed, equally spaced apart from each other, circumferentially on an end of the third shifter 74 on a side of the fourth speed driven idle gear 66. The fourth speed driven idle gear 66 includes a plurality of sixth lock protrusions 89 . . . to be engaged with corresponding ones of the sixth engagement protrusions 88 . . . .

It is to be noted that the first to sixth engagement protrusions 78 . . . , 80 . . . , 82 . . . , 84 . . . , 86 . . . , 88 . . . , and the first to sixth lock protrusions 79 . . . , 81 . . . , 83 . . . , 85 . . . , 87 . . . , 89 . . . , which are formed as small as possible, are set in numbers as many as possible. Further, the first to sixth engagement protrusions 78 . . . , 80 . . . , 82 . . . , 84 . . . , 86 . . . , 88 . . . , and the first to sixth lock protrusions 79 . . . , 81 . . . , 83 . . . , 85 . . . , 87 . . . , 89 . . . are formed like teeth of gears such that each is tapered toward a leading end thereof. By setting the size, quantity, and shape for the first to sixth engagement protrusions 78 . . . , 80 . . . , 82 . . . , 84 . . . , 86 . . . , 88 . . . , and the first to sixth lock protrusions 79 . . . , 81 . . . , 83 . . . , 85 . . . , 87 . . . , 89 . . . as described above, it is possible to minimize engagement noise produced when each of the first to sixth engagement protrusions 78 . . . , 80 . . . , 82 . . . , 84 . . . , 86 . . . , 88 . . . engages a corresponding one of the first to sixth lock protrusions 79 . . . , 81 . . . , 83 . . . , 85 . . . , 87 . . . , 89 . . . .

Figure 10:
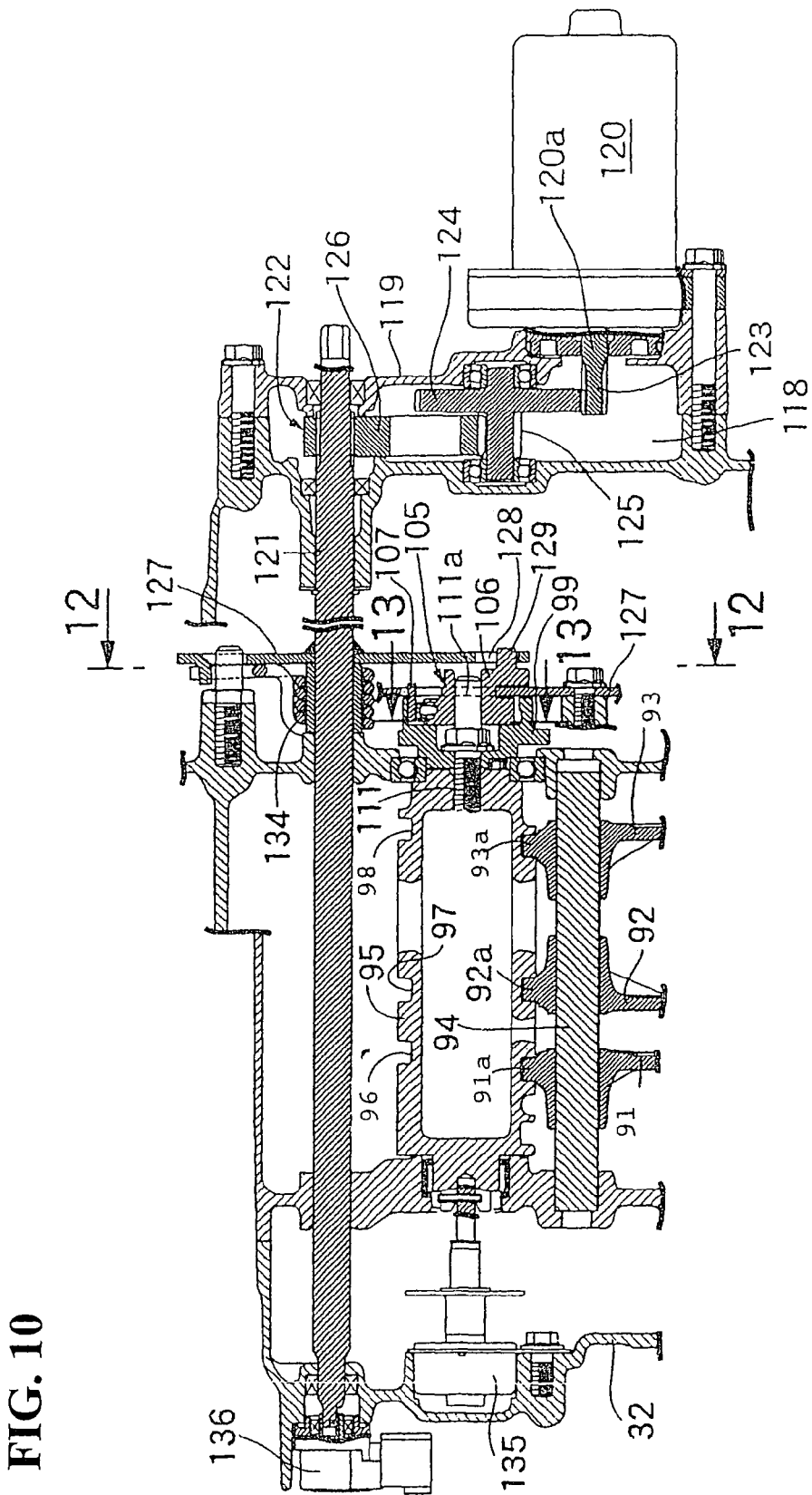
FIG. 10 is a cross-sectional view taken along line 10-10 of FIG. 2.

Referring also to FIG. 10, the first to third shifters 72, 73, 74 are rotatably supported by first to third shift forks 91, 92, 93, respectively. The first to third shift forks 91, 92, 93 are supported on a shift fork shaft 94, which has an axis extending in parallel with the first and second main shafts 44, 45 and the countershaft 46 and is supported by the crankcase 23. The first to third shift forks 91, 92, 93 are axially slidable along the shift fork shaft 94. A shift drum 95 is axially rotatably supported by the crankcase 23. The shift drum 95 has an axis that extends in parallel with the first and second main shafts 44, 45 and the countershaft 46. The shift drum 95 includes first to third lead grooves 96, 97, 98 formed on an outer peripheral surface thereof. The first to third shift forks 91 to 93 include pins 91a, 92, 93a, formed in a protruding condition thereon, respectively. These pins 91a, 92, 93a engage the first to third lead grooves 96, 97, 98, respectively. When the shift drum 95 rotates, the first to third shift forks 91 to 93 axially slide in accordance with a pattern of the first to third lead grooves 96 to 98.

Figure 11:
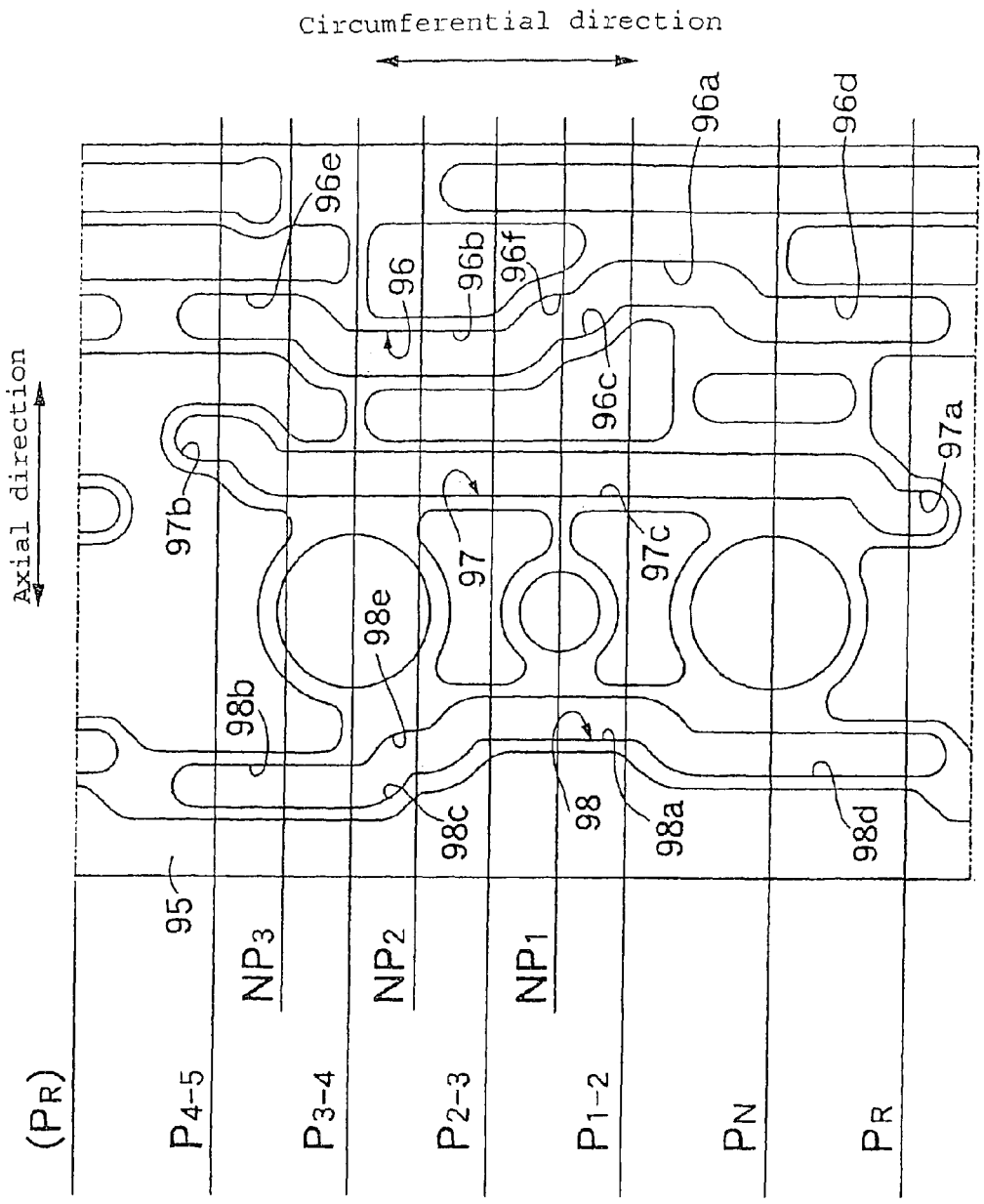
FIG. 11 is a development view showing an outer peripheral surface of a shift drum.

Referring to FIG. 11, the first lead groove 96 functions to guide the first shift fork 91 holding the first shifter 72 for slidable motion thereof. The first lead groove 96 includes a first speed gear train establishment portion 96a, a third speed gear train establishment portion 96b, a communication portion 96c, and a pair of intermediate position portions 96d, 96e. The first speed gear train establishment portion 96a extends circumferentially along the shift drum 95 such that the first shifter 72 engages the engaged member 71 fixedly attached to the first speed drive idle gear 57. The third speed gear train establishment portion 96b extends circumferentially along the shift drum 95 at a position offset axially of the shift drum 95 from the first speed gear train establishment portion 96a such that the first shifter 72 engages the third speed drive idle gear 59. The communication portion 96c connects between the first and third speed gear train establishment portion 96a, 96b. The pair of intermediate position portions 96d, 96e functions to hold the first shifter 72 at the intermediate position. Further, the communication portion 96c includes a neutral portion 96f disposed at a central portion thereof. The neutral portion 96f, formed to extend slightly circumferentially along the shift drum 95, holds the first shifter 72 at a position, at which the first shifter 72 is disengaged from the first and third speed drive idle gears 57, 59.

The second lead groove 97 functions to guide the second shift fork 92 holding the second shifter 73 for slidable motion thereof. The second lead groove 97 includes a reverse gear train establishment portion 97a, a fifth speed gear train establishment portion 97b, and an intermediate position portion 97c. The reverse gear train establishment portion 97a extends circumferentially along the shift drum 95 such that the second shifter 73 engages the reverse driven idle gear 69. The fifth speed gear train establishment portion 97b extends circumferentially along the shift drum 95 at a position offset axially of the shift drum 95 from the reverse gear train establishment portion 97a such that the second shifter 73 engages the fifth speed driven idle gear 62. The intermediate position portion 97c functions to hold the second shifter 73 at the intermediate position.

The third lead groove 98 functions to guide the third shift fork 93 holding the third shifter 74 for slidable motion thereof. The third lead groove 98 includes a second speed gear train establishment portion 98a, a fourth speed gear train establishment portion 98b, a communication portion 98c, and an intermediate position portion 98d. The second speed gear train establishment portion 98a extends circumferentially along the shift drum 95 such that the third shifter 74 engages the second speed driven idle gear 64. The fourth speed gear train establishment portion 98b extends circumferentially along the shift drum 95 at a position offset axially of the shift drum 95 from the second speed gear train establishment portion 98a such that the third shifter 74 engages the fourth speed driven idle gear 66. The communication portion 98c connects between the second and fourth speed gear train establishment portion 98a, 98b. The intermediate position portion 98d functions to hold the third shifter 74 at the intermediate position. Further, the communication portion 98c includes a neutral portion 98e disposed at a central portion thereof. The neutral portion 98e, formed to extend slightly circumferentially along the shift drum 95, holds the third shifter 74 at a position, at which the third shifter 74 is disengaged from the second and fourth speed driven idle gear 64, 66.

The shift drum 95 is sequentially set with a reverse position $P_R$, a neutral position $P_N$, a first-second speed position $P_{1-2}$, a second-third speed position $P_{2-3}$, a third-fourth speed position $P_{3-4}$, and a fourth-fifth speed position $P_{4-5}$, each being spaced apart by 60 degrees from each other.

At the reverse position $P_R$, the pins 91a, 93a of the first and third shift forks 91, 93 are engaged with the intermediate position portions 96d, 98d of the first and third lead grooves 96, 98 and the pin 92a of the second shift fork 92 is engaged with the reverse gear train establishment portion 97a of the second lead groove 97, so that the reverse gear train GR is established. At the neutral position $P_N$, the pins 91a to 93a of the first to third shift forks 91 to 93 are engaged with the intermediate position portions 96d to 98d of the first to third lead grooves 96 to 98, so that none of the gear trains G1 to G5, GR is established. At the first-second speed position $P_{1-2}$, the pin 91a of the first shift fork 91 is engaged with the first speed gear train establishment portion 96a of the first lead groove 96, the pin 92a of the second shift fork 92 is engaged with the intermediate position portion 97c of the second lead groove 97, and the pin 93a of the third shift fork 93 is engaged with the second speed gear train establishment portion 98a of the third lead groove 98, so that the first and second speed gear trains G1, G2 are both established. At the second-third speed position $P_{2-3}$, the pin 91a of the first shift fork 91 is engaged with the third speed gear train establishment portion 96b of the first lead groove 96, the pin 92a of the second shift fork 92 is engaged with the intermediate position portion 97c of the second lead groove 97, and the pin 93a of the third shift fork 93 is engaged with the second speed gear train establishment portion 98a of the third lead groove 98, so that the second and third speed gear trains G2, G3 are both established. At the third-fourth speed position $P_{3-4}$, the pin 91a of the first shift fork 91 is engaged with the third speed gear train establishment portion 96b of the first lead groove 96, the pin 92a of the second shift fork 92 is engaged with the intermediate position portion 97c of the second lead groove 97, and the pin 93a of the third shift fork 93 is engaged with the fourth speed gear train establishment portion 98b of the third lead groove 98, so that the third and fourth speed gear trains G3, G4 are both established. Further, at the fourth-fifth speed position $P_{4-5}$, the pin 91a of the first shift fork 91 is engaged with the intermediate position portion 96e of the first lead groove 96, the pin 92a of the second shift fork 92 is engaged with the fifth speed gear train establishment portion 97b of the second lead groove 97, and the pin 93a of the third shift fork 93 is engaged with the fourth speed gear train establishment portion 98b of the third lead groove 98, so that the fourth and fifth speed gear trains G4, G5 are both established.

Specifically, during upshift, a gear train on the side of high speed gear positions can be established in advance of a shift to a high speed gear position. During downshift, a gear train on the side of low speed gear positions can be established in advance of a shift to a low speed gear position.

A 1-3 neutral position $NP_1$ is set at a central portion between the first-second speed position $P_{1-2}$ and the second-third speed position $P_{2-3}$ disposed along the circumferential direction of the shift drum 95. The 1-3 neutral position $NP_1$ serves as a neutral position provided when establishment of the first speed gear train G1 is switched to that of the third speed gear train G3, or vice versa, disposed between the first main shaft 44 and the countershaft 46. The neutral portion 96f of the first lead groove 96 is disposed at the 1-3 neutral position $NP_1$. A 2-4 neutral position $NP_2$ is set at a central portion between the second-third speed position $P_{2-3}$ and the third-fourth speed position $P_{3-4}$ disposed along the circumferential direction of the shift drum 95. The 2-4 neutral position $NP_2$ serves as a neutral position provided when establishment of the second speed gear train G2 is switched to that of the fourth speed gear train G4, or vice versa, disposed between the second main shaft 45 and the countershaft 46. The neutral portion 98e of the third lead groove 98 is disposed at the 2-4 neutral position $NP_2$. A 3-5 neutral position $NP_3$ is set at a central portion between the third-fourth speed position $P_{3-4}$ and the fourth-fifth speed position $P_{4-5}$ disposed along the circumferential direction of the shift drum 95. The 3-5 neutral position $NP_3$ serves as a neutral position provided when establishment of the third speed gear train G3 is switched to that of the fifth speed gear train G5, or vice versa, disposed between the first main shaft 44 and the countershaft 46.

Figure 12:
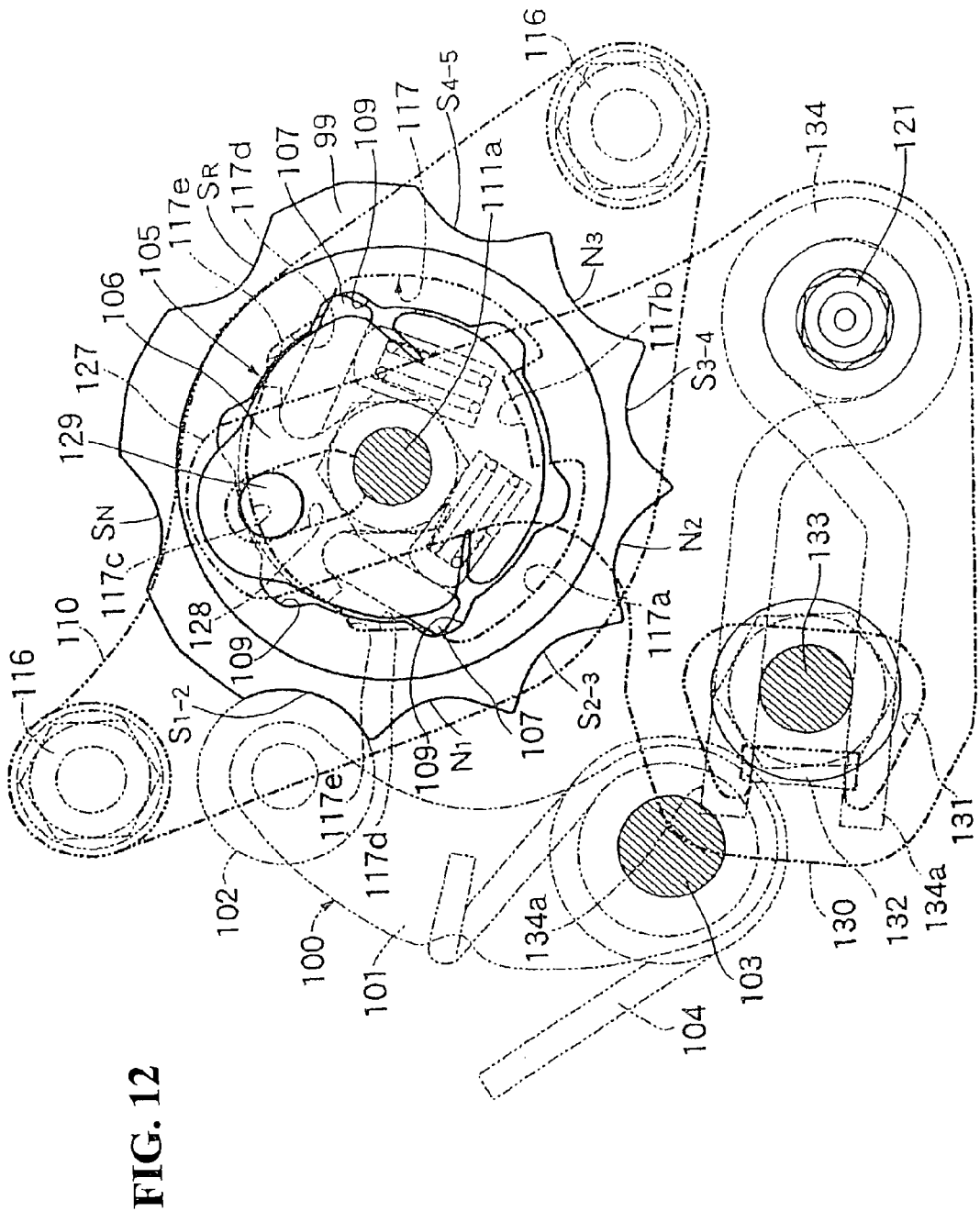
FIG. 12 is a cross-sectional view taken along line 12-12 of FIG. 10, showing a condition of running at a first speed.
Figure 13:
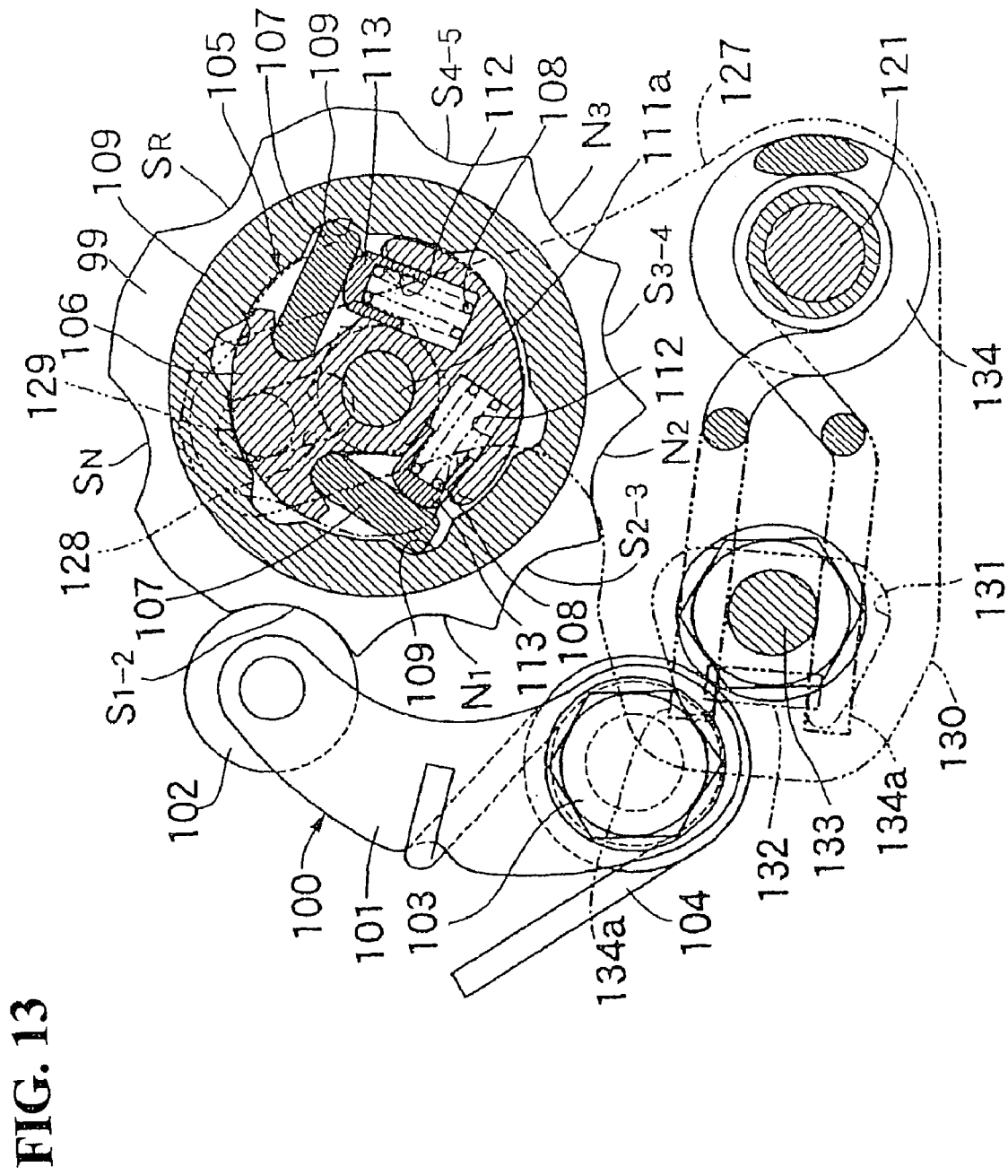
FIG. 13 is an enlarged cross-sectional view taken along line 13-13 of FIG. 10, showing the condition of running at the first speed.
Figure 14:
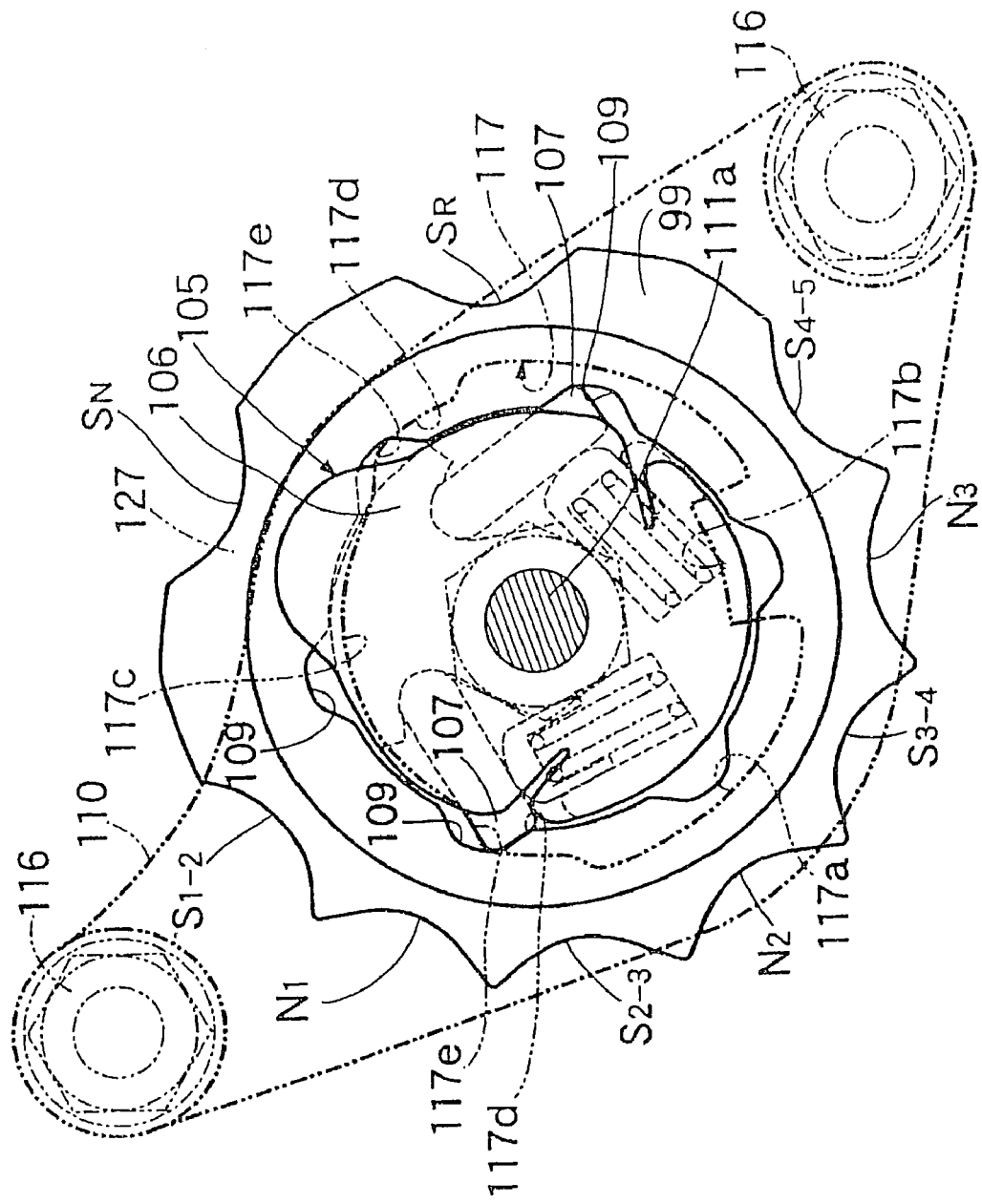
FIG. 14 is a view showing a condition of part of a feed mechanism in a middle of rotation of a shift drum center.

Referring further to FIGS. 12 and 13, a shift drum center 99, which rotates with the shift drum 95, is secured to one end of the shift drum 95 with a coaxial bolt 111. Corresponding individually to the reverse position $P_R$, the neutral position $P_N$, the first-second speed position $P_{1-2}$, the second-third speed position $P_{2-3}$, the third-fourth speed position $P_{3-4}$, and the fourth-fifth speed position $P_{4-5}$ set on the shift drum 95 for establishing the corresponding one of the first to fifth speed gear train G1 to G5 and the reverse gear train GR, positioning notches are disposed, equally spaced apart from each other, on an outer periphery of the shift drum center 99. The positioning notches are, specifically: a reverse positioning notch $S_R$, a neutral positioning notch $S_N$, a first-second speed positioning notch $S_{1-2}$, a second-third speed positioning notch $S_{2-3}$, a third-fourth speed positioning notch $S_{3-4}$, and a fourth-fifth speed positioning notch $S_{4-5}$. In accordance with the embodiment of the present invention, each of these notches $S_R$, $S_N$, $S_{1-2}$, $S_{2-3}$, $S_{3-4}$, and $S_{4-5}$ is disposed on the outer periphery of the shift drum center 99, being spaced at intervals of 60 degrees from each other.

Additionally, neutral notches $N_1$, $N_2$, $N_3$ corresponding individually to the 1-3 neutral position $NP_1$, the 2-4 neutral position $NP_2$, and the 3-5 neutral position $NP_3$, respectively, are also disposed on the outer periphery of the shift drum center 99. Each of the neutral notches $N_1$, $N_2$, $N_3$ is disposed at a central portion between the first-second speed positioning notch $S_{1-2}$ and the second-third speed positioning notch $S_{2-3}$, between the second-third speed positioning notch $S_{2-3}$ and the third-fourth speed positioning notch $S_{3-4}$, and between the third-fourth speed positioning notch $S_{3-4}$ and the fourth-fifth speed positioning notch $S_{4-5}$.

A drum stopper arm 100 is to engage selectively each of the notches $S_R$, $S_N$, $S_{1-2}$, $S_{2-3}$, $S_{3-4}$, $S_{4-5}$, $N_1$, $N_2$, and $N_3$. The drum stopper arm 100 includes an arm 101 and a roller 102. The arm 101 has a proximal end that is rotatably journaled on the case half body 23a in the crankcase 23 about a pivot 103 having an axis extending in parallel with the axis of the shift drum 95 and the shift drum center 99. The roller 102 is journaled on a distal end of the arm 101 so as to be engaged with one of the notches $S_R$, $S_N$, $S_{1-2}$, $S_{2-3}$, $S_{3-4}$, $S_{4-5}$, $N_1$, $N_2$, and $N_3$. It is to be noted that each of the notches $S_R$, $S_N$, $S_{1-2}$, $S_{2-3}$, $S_{3-4}$, $S_{4-5}$, $N_1$, $N_2$, and $N_3$ is formed to be arcuately recessed so as to stabilize an engagement condition of the roller 102.

A torsion spring 104 is fitted between the proximal end of the arm 101 and the case half body 23a. The arm 101, specifically the drum stopper arm 100 is urged toward a center of rotation of the shift drum center 99 by a spring force exhibited by the torsion spring 104 such that the roller 102 is engaged with one of the notches $S_R$, $S_N$, $S_{1-2}$, $S_{2-3}$, $S_{3-4}$, $S_{4-5}$, $N_1$, $N_2$, and $N_3$.

The shift drum center 99 is intermittently rotatably driven through a predetermined angle (60 degrees according to the embodiment of the present invention) by a feed mechanism 105. The feed mechanism 105 includes a drum shifter 106, a pair of pawls 107, 107, a pair of springs 108, 108, engagement recesses 109, 109 . . . , a guide plate 110, and a shift operation motor 120. At least part of the drum shifter 106 is disposed inside the shift drum center 99 so as to be capable of rotating about an axis coaxial with the shift drum center 99. The pair of pawls 107, 107 is symmetrically mounted on the drum shifter 106 so as to be raised or lowered radially of the drum shifter 106. The pair of springs 108, 108 urges the pawls 107 . . . in a raising direction. The engagement recesses 109, 109 . . . are disposed circumferentially on an inner periphery of the shift drum center 99, equally spaced apart from each other, such that the pawls 107, 107 are engaged therein. The guide plate 110 is a stationary member for guiding the pawls 107, 107 along a raised condition thereof according to rotation of the drum shifter 106. The shift operation motor 120 gives the drum shifter 106 rotatable drive.

The drum shifter 106 is supported rotatably about an axis coaxial with the shift drum center 99 with a shaft 111a coaxially included in the bolt 111 that connects the shift drum center 99 to one end of the shift drum 95. A large part of the drum shifter 106, with only a part protruding outwardly from the shift drum center 99, is relatively rotatably disposed in the shift drum center 99.

Each of the springs 108 . . . is compressively disposed between a closed end of each of accommodation recesses 112, 112 disposed on an outer periphery of the drum shifter 106 and each of bottomed cylindrical lifters 113, 113 slidably fitted in the accommodation recesses 112, 112 so as to abut against leading ends of the pawls 107 . . . . Accordingly, the pawls 107 . . . are urged in the raising direction by the springs 108 . . . . When raised, the pawls 107 . . . have leading ends thereof protruding from the outer periphery of the drum shifter 106 and, when lowered, have the leading ends substantially flush with the outer periphery of the drum shifter 106.

A plurality of (six according to the embodiment of the present invention) engagement recesses 109, 109 . . . , each being equally spaced apart from each other, is disposed circumferentially along the inner periphery of the shift drum center 99. With the drum stopper arm 100 engaged in any one of the reverse positioning notch $S_R$, neutral positioning notch $S_N$, the first-second speed positioning notch $S_{1-2}$, the second-third speed positioning notch $S_{2-3}$, the third-fourth speed positioning notch $S_{3-4}$, and the fourth-fifth speed positioning notch $S_{4-5}$, the leading ends of the pawls 107 . . . can be selectively engaged with two specific engagement recesses 109, 109 . . . , between which two adjoining engagement recesses 109, 109 . . . are sandwiched.

The guide plate 110 is fastened to the case half body 23a using a pair of bolts 116, 116 at a position, at which the shift drum center 99 is sandwiched between the case half body 23a in the crankcase 23 and the guide plate 110. The guide plate 110 includes a guide hole 117 corresponding to the drum shifter 106.

The guide hole 117 includes a large diameter arcuate portion 117a, a restriction protrusion 117b, a small diameter arcuate portion 117c, and connection portions 117d, 117d. The large diameter arcuate portion 117a is formed to have a diameter larger than an outer diameter of the drum shifter 106 about the axis of rotation of the shift drum center 99 and the drum shifter 106, specifically, an axis of the shaft 111a. The restriction protrusion 117b protrudes inwardly of an outer periphery of the drum shifter 106 from a central portion of the large diameter arcuate portion 117a. The small diameter arcuate portion 117c is formed to have a diameter smaller than the outer diameter of the drum shifter 106 about the axis of the shaft 111a. The connection portions 117d, 117d connect both ends of the large diameter arcuate portion 117a and both ends of the small diameter arcuate portion 117c. The large diameter arcuate portion 117a has a circumferential length equivalent to a length corresponding to a distance between the two engagement recesses 109 . . . , with which the leading ends of the two pawls 107 . . . are engaged.

The connection portions 117d . . . are formed to have step portions 117e . . . at centers thereof. When the pawl 107 engaged in the engagement recess 109 moves to the side of the small diameter arcuate portion 117c in accordance with rotation of the drum shifter 106, the step portion 117e abuts on the pawl 107 to press the pawl 107 toward a lowering side. The step portions 117e . . . are disposed outwardly of the inner periphery of the shift drum center 99.

The restriction protrusion 117b functions to restrict rotation of the drum shifter 106 by abutting on the leading end of one of the two pawls 107 . . . as the drum shifter 106 makes one cycle of operation so as to stop temporarily in mid-operation in accordance with the operation of the shift operation motor 120 that temporarily stops in mid-operation.

Reference is made again to FIG. 10. A cover 119 is fastened to the first crankcase cover 31. The cover 119 defines a reduction mechanism accommodation chamber 118 between the cover 119 and the first crankcase cover 31. The cover 119 is mounted with the shift operation motor 120. The shift operation motor 120 has an axis of rotation extending in parallel with the shift drum 95. The shift operation motor 120 is mounted to the cover 119 with an output shaft 120a thereof advancing into the reduction mechanism accommodation chamber 118. A change shaft 121 having an axis extending in parallel with the shift drum 95 is disposed so as to penetrate through rotatably the first crankcase cover 31, the cover 119, and the second crankcase cover 32. A reduction gear mechanism 122, disposed between the output shaft 120a and the change shaft 121, is housed in the reduction mechanism accommodation chamber 118.

The reduction gear mechanism 122 includes a drive gear 123, a first intermediate gear 124, a second intermediate gear 125, and a driven sector gear 126. The drive gear 123 is integrated with the output shaft 120a of the shift operation motor 120 inside the reduction mechanism accommodation chamber 118. The first intermediate gear 124 meshes with the drive gear 123. The second intermediate gear 125 rotates integrally with the first intermediate gear 124. The driven sector gear 126 is secured to one end of the change shaft 121 in the reduction mechanism accommodation chamber 118. The driven sector gear 126 meshes with the second intermediate gear 125. Rotatable power drive of the shift operation motor 120 is transmitted to the change shaft 121 with a speed thereof reduced by the reduction gear mechanism 122.

A change arm 127 is disposed on the change shaft 121. Having a proximal end fixed to the change shaft 121, the change arm 127 extends toward the side of the drum shifter 106 radially along the change shaft 121. The change arm 127 includes a slot-like engagement hole 128 extending radially along the change shaft 121. An engagement pin 129 is implanted in the drum shifter 106 at a position offset from the axis of rotation of the drum shifter 106. The engagement pin 129 is engaged with the engagement hole 128.

An arm 130 is integrated in a connected row arrangement with the change arm 127 at the proximal end thereof. The arm 130 extends radially along the change shaft 121 to form with the change arm 127 substantially an L-shape. The arm 130 includes an arcuate slot 131 formed at a leading end thereof. The arcuate slot 131 is disposed about an axis of the change shaft 121. A protrusion 132 is disposed in a protruding condition at a position on a straight line connecting a peripheral center of the arcuate slot 131 and the axis of the change shaft 121.

A pin 133 to be passed through the slot 131 is implanted in the case half body 23a in the crankcase 23. A clamp spring 134 is disposed between the change arm 127 and the arm 130, and the case half body 23a of the crankcase 23 so as to surround the change shaft 121. The clamp spring 134 has a pair of clamp arms 134a, 134a on both sides thereof that clamp the protrusion 132 and the pin 133 from both sides. These arrangements result in the change arm 127 and the arm 130 being urged to a neutral position on a straight line connecting the peripheral center of the slot 131 and the change shaft 121, on which the protrusion 132 and the pin 133 are lined up.

Operation will be described below, in which upshift is performed to the second speed from a condition of running at the first speed. Specifically, the drum stopper arm 100 is engaged in the first-second speed positioning notch $S_{1-2}$ of the shift drum center 99 and the first hydraulic clutch 52 is connected with the second hydraulic clutch 53 disconnected. The change shaft 121 and the change arm 127 are rotated clockwise in FIG. 12 in accordance with the operation of the shift operation motor 120. Because of the engagement pin 129 being engaged in the engagement hole 128 in the change arm 127, the drum shifter 106 of the feed mechanism 105 rotates clockwise in FIG. 12, while displacing the engagement pin 129 in the engagement hole 128 toward the change shaft 121.

As a result, one of the pawls 107, 107 engaged in two engagement recesses 109, 109, respectively, is rotated about the axis of the shaft 111$a$ along a portion corresponding to the large diameter arcuate portion 117$a$ in the guide hole 117 in the guide plate 110. The specific pawl 107 thereby presses to rotate the shift drum center 99 clockwise in FIG. 12.

During such rotatable drive of the shift drum 95, the shift drum 95 can at times rotate in advance. In such a case, referring to FIG. 14, with the gear trains G1 to G5 and GR not in an established state, the other one of the pawls 107, 107 (the one not pressing the shift drum center 99) abuts on the step portion 117$e$ in the middle of the connection portion 117$d$ in the guide hole 117, so that the other pawl 107 abuts on and engages the engagement recess 109. The shift drum 95 can thereby be stopped from rotating in advance.

Figure 15:
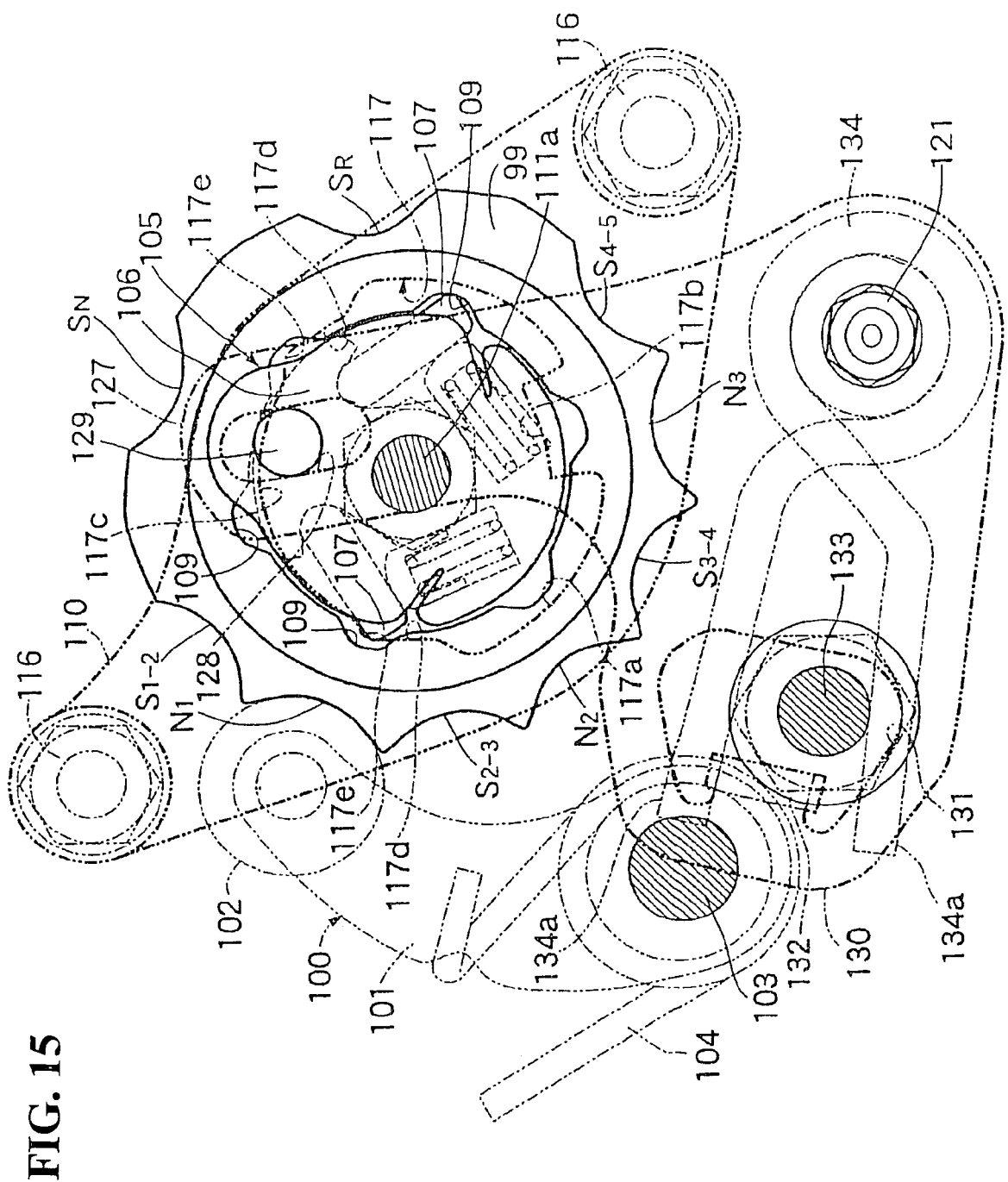
FIG. 15 is a view showing a condition of upshift being progressed from the first to second speed, corresponding to FIG. 12.

In this condition, referring to FIG. 15, the roller 102 of the drum stopper arm 100 rides over a peak between the first-second speed positioning notch $S_{1-2}$ and the neutral notch $N_1$ to be engaged in the neutral notch $N_1$. An accurate neutral position of the shift drum 95 can thereby be achieved. When the drum shifter 106 further rotates, the aforementioned other pawl 107 is rotated so as to be folded down by the step portion 117$e$. The roller 102 of the drum stopper arm 100 then rides over a peak between the neutral notch $N_1$ and the second-third speed positioning notch $S_{2-3}$.

Figure 16:
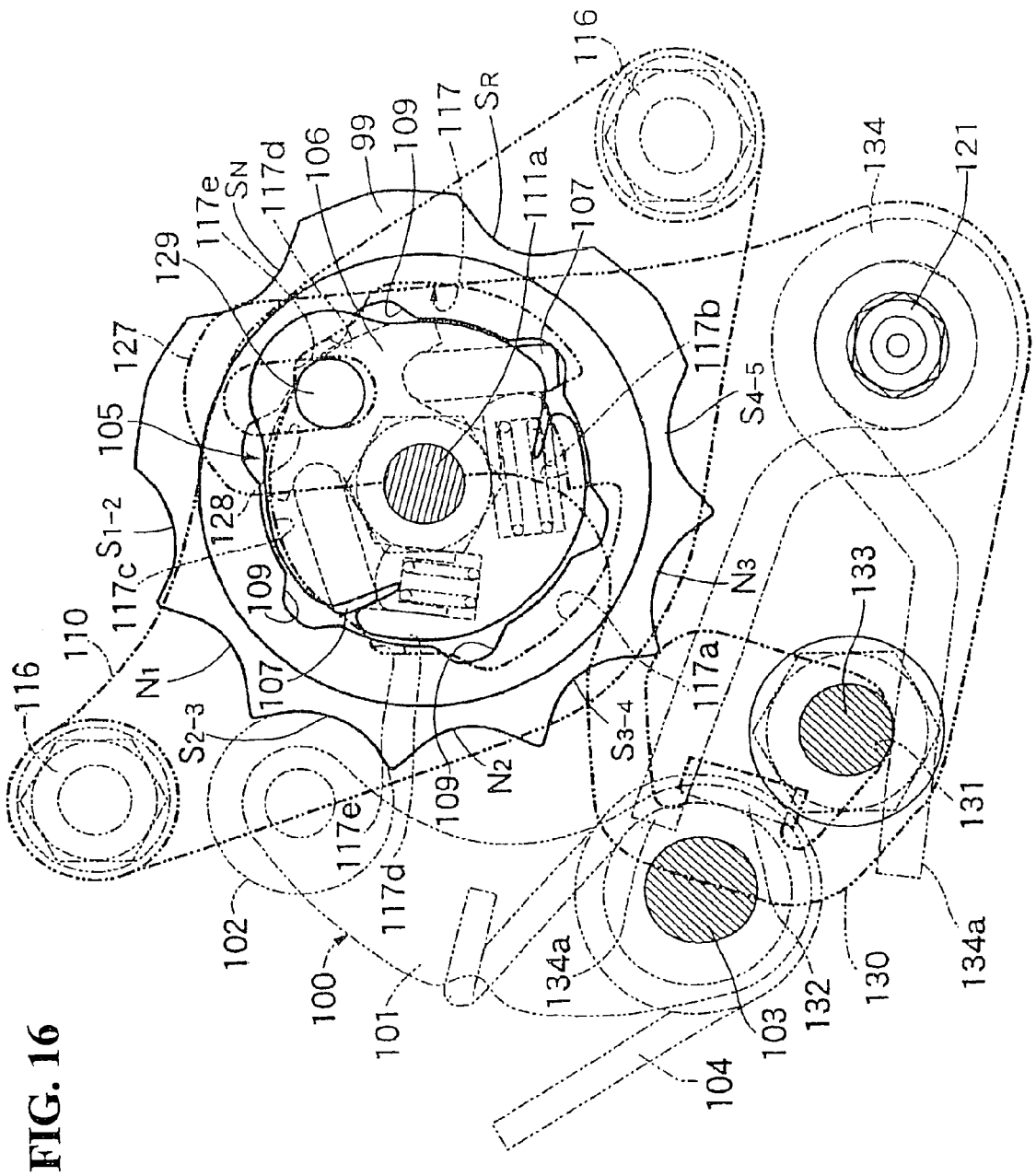
FIG. 16 is a view showing a condition of running at the second speed, corresponding to FIG. 12.

Further rotation of the drum shifter 106 causes a leading end of the aforementioned other pawl 107 to make a sliding contact with the small diameter arcuate portion 117$c$ of the guide hole 117 in the guide plate 110. When the drum shifter 106 is rotated until the roller 102 rides over the peak between the neutral notch $N_1$ and the second-third speed positioning notch $S_{2-3}$, the shift operation motor 120 is stopped. The shift drum center 99 is rotated until the roller 102 of the drum stopper arm 100 engages in the second-third speed positioning notch $S_{2-3}$ as shown in FIG. 16. Specifically, the shift operation motor 120 has only to exhibit power drive required to rotate the drum shifter 106 through an angle less than 60 degrees which is the interval between the first-second speed positioning notch $S_{1-2}$ and the second-third speed positioning notch $S_{2-3}$, specifically, for example, only by 53.7 degrees.

As described above, the feed mechanism 105 is adapted to reduce temporarily and gradually a rotational speed of the shift drum 95 in mid-operation of upshift from the first to second speed. The operation of the feed mechanism 105 as described above is performed similarly during upshift from the second to third speed, from the third to fourth speed, and from the fourth to fifth speed, and during downshift from the fifth to fourth speed, from the fourth to third speed, from the third to second speed, and from the second to first speed.

After the rotation of the shift drum 95 is stopped by making the roller 102 of the drum stopper arm 100 engaged in the reverse positioning notch $S_R$, the neutral positioning notch $S_N$, the first-second speed positioning notch $S_{1-2}$, the second-third speed positioning notch $S_{2-3}$, the third-fourth speed positioning notch $S_{3-4}$, and the fourth-fifth speed positioning notch $S_{4-5}$, the change arm 127 is returned to the position shown in FIGS. 12 and 13 by a spring tension of the clamp spring 134, and the drum shifter 106 is returned to the position shown in FIGS. 12 and 13.

The angle of rotation of the shift drum 95 is detected by a drum rotational angle detector 135. The drum rotational angle detector 135 is connected to a distal end of the shift drum 95 and mounted on the second crankcase cover 32. The angle of rotation of the change shaft 121 is detected by a change shaft rotational angle detector 136. The change shaft rotational angle detector 136 is connected to a distal end of the change shaft 121 and mounted on the second crankcase cover 32.

Figure 17:
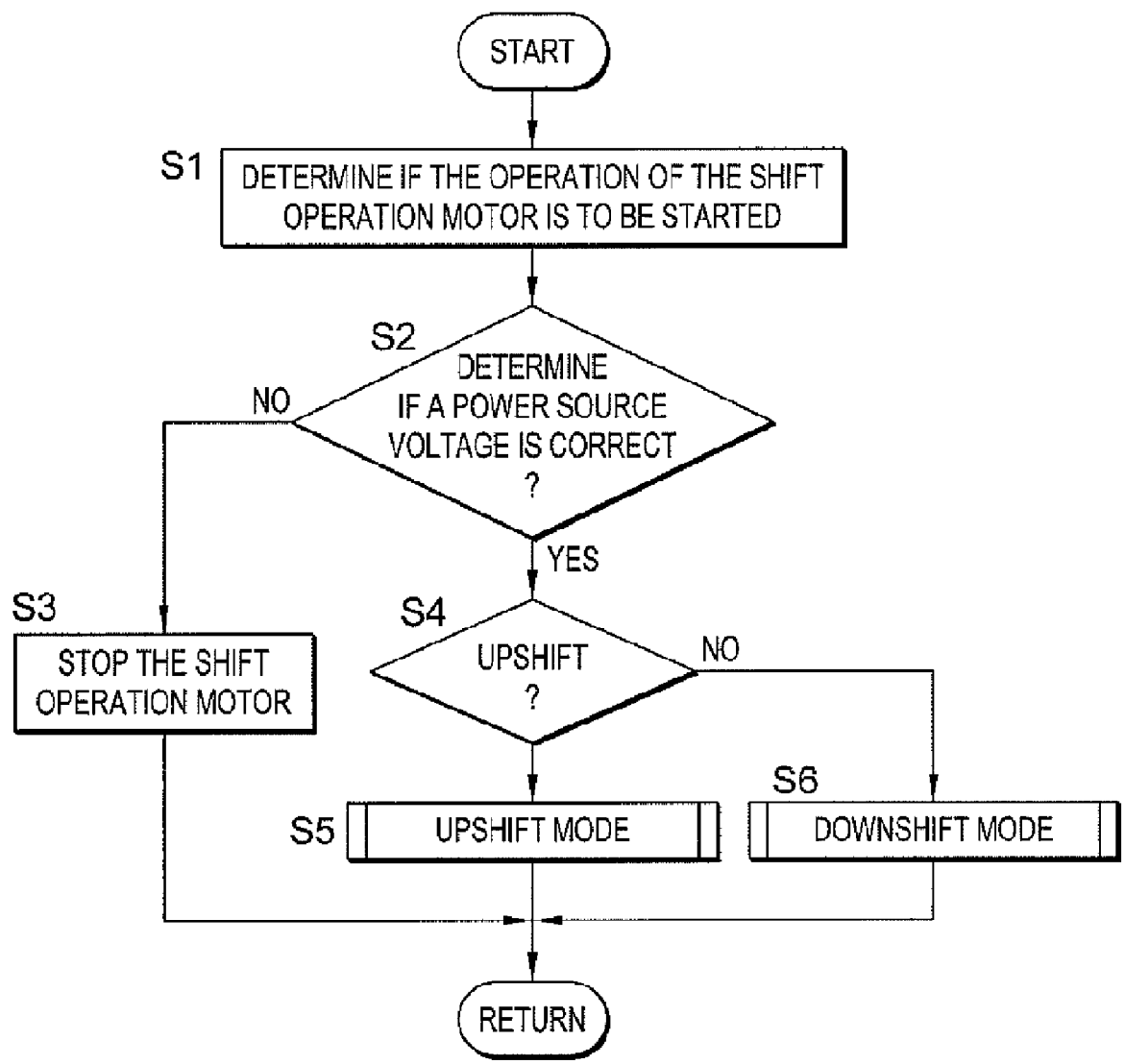
FIG. 17 is a flowchart showing an operation control procedure of a shift operation motor.

Operation of the shift operation motor 120 is controlled in accordance with steps shown in FIG. 17. In step S1, it is determined whether or not the operation of the shift operation motor 120 is to be started and the rotational angle of the change shaft 121 is initialized and reset to "0." In step S2 that follows, it is determined whether or not a power source voltage, specifically, an output voltage of a battery is in a correct condition exceeding a predetermined value. If it is determined that the power source voltage falls short of the predetermined value, the operation proceeds to step S3, in which the operation of the shift operation motor 120 is stopped. If it is determined that the power source voltage is correct, the operation proceeds from step S2 to step S4, in which it is determined whether or not an upshift operation is to be executed. If it is determined that the upshift operation is to be executed, an upshift mode operation is executed in step S5. If it is determined that the upshift operation is not to be executed, a downshift mode operation is executed in step S6.

Figure 18:
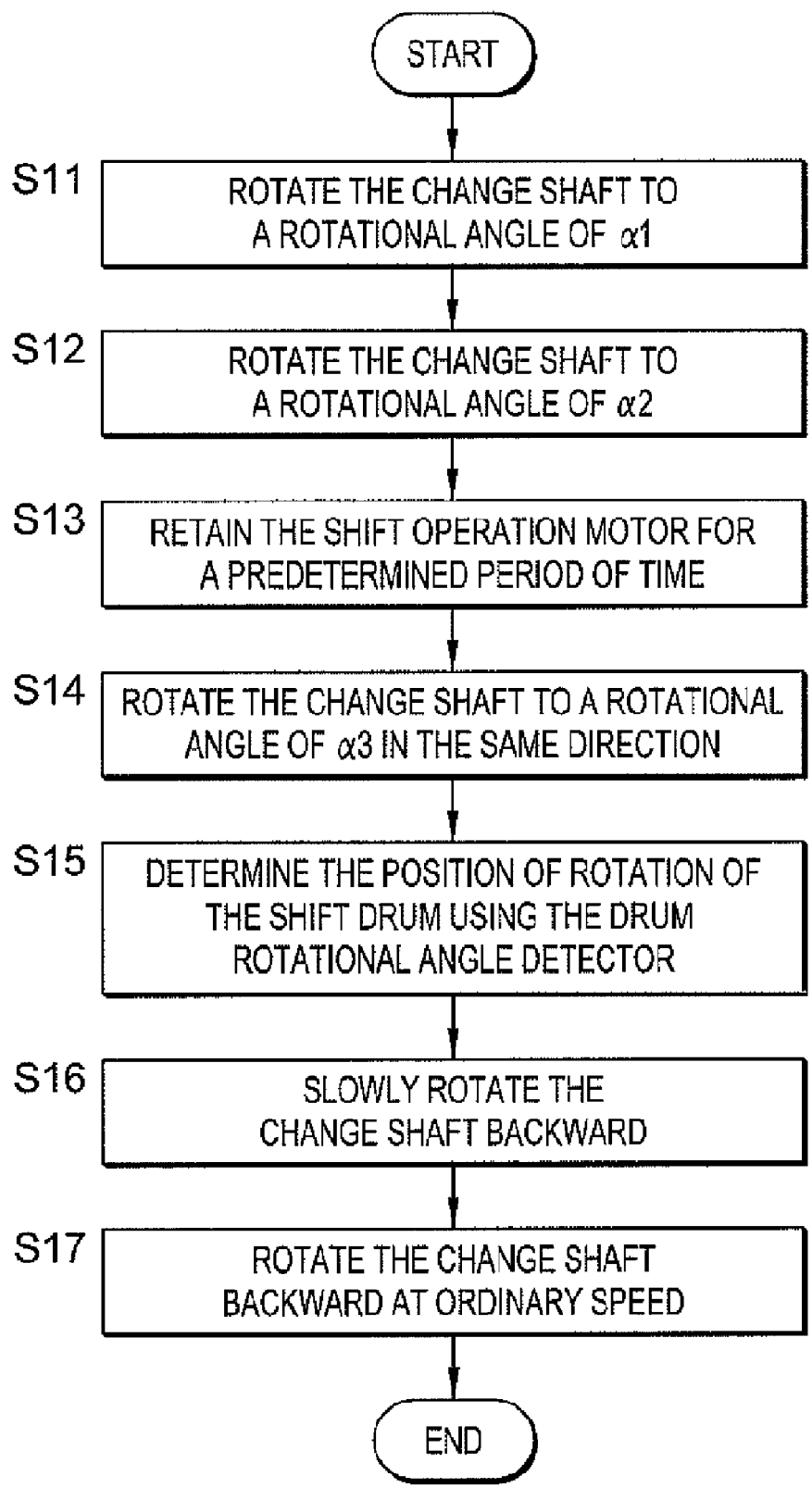
FIG. 18 is a flowchart showing a control procedure in an upshift mode.
Figure 19:
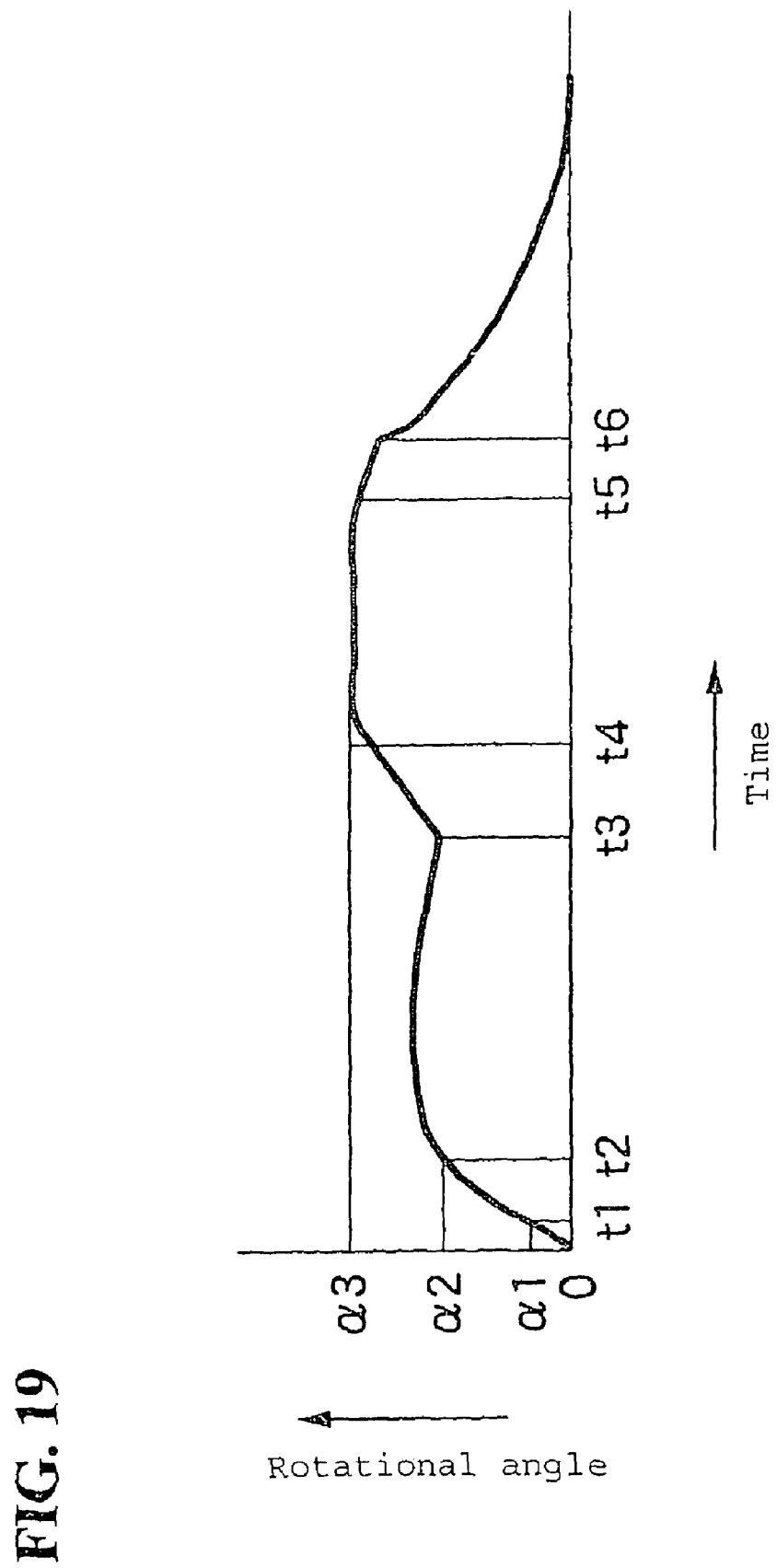
FIG. 19 is a diagram showing changes in a rotational angle of a change shaft during upshift.

In the upshift mode, operation shown in FIG. 18 is executed. The upshift mode operation changes the rotational angle of the change shaft 121 as shown in FIG. 19. Specifically, in step S11, the shift operation motor 120 is operated to rotate the change shaft 121 such that the rotational angle of the change shaft 121 detected by the change shaft rotational angle detector 136 is $\alpha 1$. Step S11 is to check for the direction and required time of rotation of the change shaft 121. When it is determined that the rotational angle $\alpha 1$ is reached at time t1, the operation proceeds to step S12, in which the shift operation motor 120 is operated to rotate the change shaft 121 such that the rotational angle of the change shaft 121 detected by the change shaft rotational angle detector 136 is $\alpha 2$. The rotational angle $\alpha 2$ is set to substantially half the rotational angle required (60 degrees according to the embodiment of the present invention) for rotating the shift drum 95 sequentially through the reverse position $P_R$, the neutral position $P_N$, the first-second speed position $P_{1-2}$, the second-third speed position $P_{2-3}$, the third-fourth speed position $P_{3-4}$, and the fourth-fifth speed position $P_{4-5}$. In accordance with the embodiment of the present invention, the rotational angle $\alpha 2$ is generally 30 degrees. The operation of the shifter through the rotation of the change shaft 121 up to the rotational angle $\alpha 2$ sets the gear train established up to that particular time in a yet to be established state, i.e., the neutral condition.

At time t2, at which the rotational angle of the change shaft 121 reaches $\alpha 2$, the operation proceeds to step S13, in which the operation of the shift operation motor 120 is temporarily stopped and the stationary state of the shift operation motor 120 is retained for a predetermined period of time $\Delta T$ up to time t3.

At time t3, the shift operation motor 120 is rotated in step S14 until the change shaft 121 is rotated to reach the rotational angle α3 in a direction identical to the direction of rotation to reach the rotational angle α1 and rotational angle α2. The rotational angle α3 represents a rotational angle required for rotating the shift drum 95 sequentially through the reverse position $P_R$, the neutral position $P_N$, the first-second speed position $P_{1-2}$, the second-third speed position $P_{2-3}$, the third-fourth speed position $P_{3-4}$, and the fourth-fifth speed position $P_{4-5}$, that is 60 degrees according to the embodiment of the present invention. The gear train to be established is established through the rotation of the change shaft 121 up to the rotational angle α3. At this time, the leading end of one of the two pawls 107 . . . abuts on the restriction protrusion 117b, which restricts the rotation of the drum shifter 106.

At time t4, in step S15 following the rotation of the change shaft 121 up to the rotational angle α3, it is determined whether or not the shift drum 95 is disposed at the predetermined position of rotation using the drum rotational angle detector 135. At time t5, the operation proceeds to step S16, in which the change shaft 121 is slowly rotated in a backward direction. This operation is performed to prevent the drum stopper arm 100 selectively engaged with the notch $S_{2-3}$, $S_{3-4}$, or $S_{4-5}$ from being disengaged. At time t6, the shift operation motor 120 is operated in step S17 to rotate the change shaft 121 in the backward direction to "0" degrees at an ordinary speed.

Operation will be described below, in which preliminary gearshift is performed to engage the drum stopper arm 100 in the second-third speed positioning notch $S_{2-3}$, prior to upshift to the third speed from a condition of running at the second speed: specifically, the drum stopper arm 100 is engaged in the first-second speed positioning notch $S_{1-2}$ of the shift drum center 99 and the second hydraulic clutch 53 is connected with the first hydraulic clutch 52 disconnected. In accordance with the operation of the shift operation motor 120, the change shaft 121 and the change arm 127 are rotated clockwise in FIG. 12. Because of the engagement pin 129 being engaged in the engagement hole 128 in the change arm 127, the drum shifter 106 of the feed mechanism 105 rotates clockwise in FIG. 12, while displacing the engagement pin 129 in the engagement hole 128 toward the change shaft 121.

As a result, one of the pawls 107, 107 engaged in two engagement recesses 109, 109, respectively, is rotated about the axis of the shaft 111a along the portion corresponding to the large diameter arcuate portion 117a in the guide hole 117 in the guide plate 110. The specific pawl 107 thereby presses to rotate the shift drum center 99 clockwise in FIG. 12. Referring to FIG. 15, when the shift drum center 99, specifically, the shift drum 95 rotates through an angle of about 30 degrees, the roller 102 of the drum stopper arm 100 rides over the peak between the first-second speed positioning notch $S_{1-2}$ and the neutral notch $N_1$ to be engaged in the neutral notch $N_1$. In this condition, the operation of the shift operation motor 120 is temporarily stopped and the stationary state of the shift operation motor 120 is retained for a predetermined period of time ΔT.

After the lapse of the predetermined period of time ΔT, the operation of the shift operation motor 120 is restarted. The drum shifter 106 is then rotated until the roller 102 of the drum stopper arm 100 engages in the second-third speed positioning notch $S_{2-3}$. The first hydraulic clutch 52 is, in this condition, connected, which completes the upshift to the third speed. When the operation of the shift operation motor 120 is then stopped, the change arm 127 is returned to the position shown in FIGS. 12 and 13 by the spring tension of the clamp spring 134, and the drum shifter 106 is returned to the position shown in FIGS. 12 and 13.

Specifically, the feed mechanism 105 having the shift operation motor 120 rotates the shift drum center 99 from a condition, in which the drum stopper arm 100 is engaged in the first-second speed positioning notch $S_{1-2}$ to a condition, in which the drum stopper arm 100 is engaged in the second-third speed positioning notch $S_{2-3}$. During this period, the feed mechanism 105 temporarily retains a condition, in which the drum stopper arm 100 is engaged in the neutral notch $N_1$, through a temporary stop in mid-rotation, thereby maintaining a neutral condition of the first shifter 72 temporarily.

As such, the feed mechanism 105 temporarily stops the rotational speed of the shift drum 95, when attempting to engage the drum stopper arm 100 in the second-third speed positioning notch $S_{2-3}$ of the shift drum center 99 through the preliminary gearshift performed to upshift from the first to third speed during running at the second speed. Such an operation of the feed mechanism 105 is similarly performed during the preliminary gearshift for upshift from the third to fifth speed and from the second to fourth speed.

The downshift mode in step S6 of FIG. 17 is executed during the preliminary gearshift for downshift from the fourth to second speed, from the fifth to third speed, and from the third to first speed. In this downshift mode, the same steps as those for the upshift are performed with the shift operation motor 120 rotated in a direction opposite to that during the upshift mode.

Effects of the first embodiment of the present invention will be described below. The first and third shifters 72, 74 rotated with the first main shaft 44 and the countershaft 46 are slidably moved toward a side, in which the first shifter 72 is disengaged from one of the first and third speed drive idle gears 57, 59 and engaged with the other idle gear, and the third shifter 74 is disengaged from one of the second and fourth speed driven idle gear 64, 66, and engaged with the other idle gear, the first and third speed drive idle gears 57, 59 being disposed on either side of the first shifter 72 and the second and fourth speed driven idle gear 64, 66 being disposed on either side of the third shifter 74. At this time, the first and third shift forks 91, 93 are guided along the neutral portions 96f, 98e formed at the central portions of the communication portions 96c, 98c included in the first and third lead grooves 96, 98 formed on the outer peripheral surface of the shift drum 95, the neutral portions 96f, 98e extending circumferentially along the shift drum 95. Consequently, as compared with an arrangement including a straight communication portion, timing can be retarded, at which the first and third shifters 72, 74 are engaged with the first or third speed drive idle gear 57, 59, and the second or fourth speed driven idle gear 64, 66, respectively.

When the first to third shifters 72 to 74 are slidably moved in order to change the state of establishment of each of the gear trains G1 to G5, and GR, the feed mechanism 105 is adapted to bring the rotation of the shift drum center 99 to a speed reduced state or a temporarily stopped state with the first to third shifters 72 to 74 in the neutral state in the middle of the sliding motion of the first to third shifters 72 to 74 as effected by rotating the shift drum center 99 only through a predetermined angle. In addition, in the middle of establishing a gear train, the rotation of the shift drum 95, that is, the sliding motion of the first to third shifters 72 to 74 is temporarily stopped to set the first to third shifters 72 to 74 in the neutral state. Moreover, the plurality of positioning notches $S_{1-2}$, $S_{2-3}$, $S_{3-4}$, and $S_{4-5}$, in which the drum stopper arm 100 is made to be selectively engaged so as to establish a gear train as selected from among the gear trains G1 to G5, are disposed, equally spaced apart from each other, on the outer periphery of the shift drum center 99. Further, there are disposed the neutral notches $N_1$, $N_2$, $N_3$ at each central portion between each pair of the positioning notches $S_{1-2}$, $S_{2-3}$, $S_{3-4}$, and $S_{4-5}$ so as to permit engagement with the drum stopper arm 100. This results in rotational resistance acting from the drum stopper arm 100 on the drum shifter 106 becoming temporarily large in the middle of establishing the gear train. This temporarily reduces the rotational speed of the shift drum 95, specifically, the sliding speed of the first to third shifters 72 to 74.

Coupled with the function of the neutral portions 96f, 98e formed at the central portions of the communication portions 96c, 98c included in the first and third lead grooves 96, 98, therefore, the difference in speed between the first and third shifters 72, 74 and the gears to engage the first and third shifters 72, 74 can be made relatively small and the engagement noise can be effectively prevented from becoming large.

The first shifter 72 rotated with the first main shaft 44 is slidably moved toward a side, in which the first shifter 72 is disengaged from one of the first and third speed drive idle gears 57, 59 and engaged with the other idle gear, the first and third speed drive idle gears 57, 59 being disposed on either side of the first shifter 72, in a condition, in which power drive from the engine E to the first main shaft 44 is being shut down and the power drive from the engine E to the second main shaft 45 is being transmitted. At this time, the first shift fork 91 is guided along the neutral portion 96f formed at the central portion of the communication portion 96c included in the first lead groove 96 formed on the outer peripheral surface of the shift drum 95, the neutral portion 96f extending circumferentially along the shift drum 95. Consequently, timing can be retarded, at which the first shifter 72 is engaged with the first or third speed drive idle gear 57, 59 relative to the rotation of the shift drum 95. In addition, the rotation of the shift drum center 99 is temporarily stopped in its mid-operation by the following. Specifically, the feed operation through a predetermined angle by the feed mechanism 105 is temporarily stopped; rotation of the shift drum 95 is temporarily stopped with the pawl 107 being engaged in the engagement recess 109 by the guide plate 110; and the drum stopper arm 100 is engaged in the neutral notch $N_1$ in the outer periphery of the shift drum 99. Consequently, a difference in speed between the first shifter 72 and relative rotation of the two idle gears 57, 59, which occurs, in a condition of both of the idle gears 57, 59 rotating as a result of establishment of the second speed gear train G2 disposed between the second main shaft 45 and the countershaft 46, as the first main shaft 44 is rotated together because of viscosity of lubricant packed between the needle bearings 48 . . . disposed between the first and second main shaft 44, 45 or viscosity of lubricant packed between the first hydraulic clutch 52 and the transmission tubular shaft 49, can be made relatively small. Accordingly, the engagement noise can be prevented from becoming large.

The third shifter 74 rotated with the countershaft 46 is slidably moved toward a side, in which the third shifter 74 is disengaged from one of the second and fourth speed driven idle gear 64, 66 and engaged with the other idle gear, the second and fourth speed driven idle gear 64, 66 being disposed on either side of the third shifter 74, in a condition, in which power drive from the engine E to the second main shaft 45 is being shut down and the power drive from the engine E to the first main shaft 44 is being transmitted. At this time, the third shift fork 93 is guided along the neutral portion 98f formed at the central portion of the communication portion 98c included in the third lead groove 98 formed on the outer peripheral surface of the shift drum 95, the neutral portion 98f extending circumferentially along the shift drum 95. Consequently, timing can be retarded, at which the third shifter 74 is engaged with the second or fourth speed driven idle gear 64, 66 relative to the rotation of the shift drum 95. In addition, the rotation of the shift drum center 99 is temporarily stopped in its mid-operation by the following: specifically, the feed operation through a predetermined angle by the feed mechanism 105 is temporarily stopped; rotational resistance of the guide plate 110; and the drum stopper arm 100 engaged in the neutral notch $N_1$ in the outer periphery of the shift drum 99. Consequently, a difference in speed between the two idle gears 64, 66 and the third shifter 74, which occurs, in a condition of both of the idle gears 64, 66 rotating as a result of establishment of the third speed gear train G3 disposed between the first main shaft 44 and the countershaft 46, as the second main shaft 45 is rotated together because of viscosity of lubricant packed between the needle bearings 48 . . . disposed between the first and second main shaft 44, 45 or viscosity of lubricant packed between the second hydraulic clutch 53 and the transmission tubular shaft 49, can be made relatively small. Accordingly, the engagement noise can be prevented from becoming large.

Figure 20:
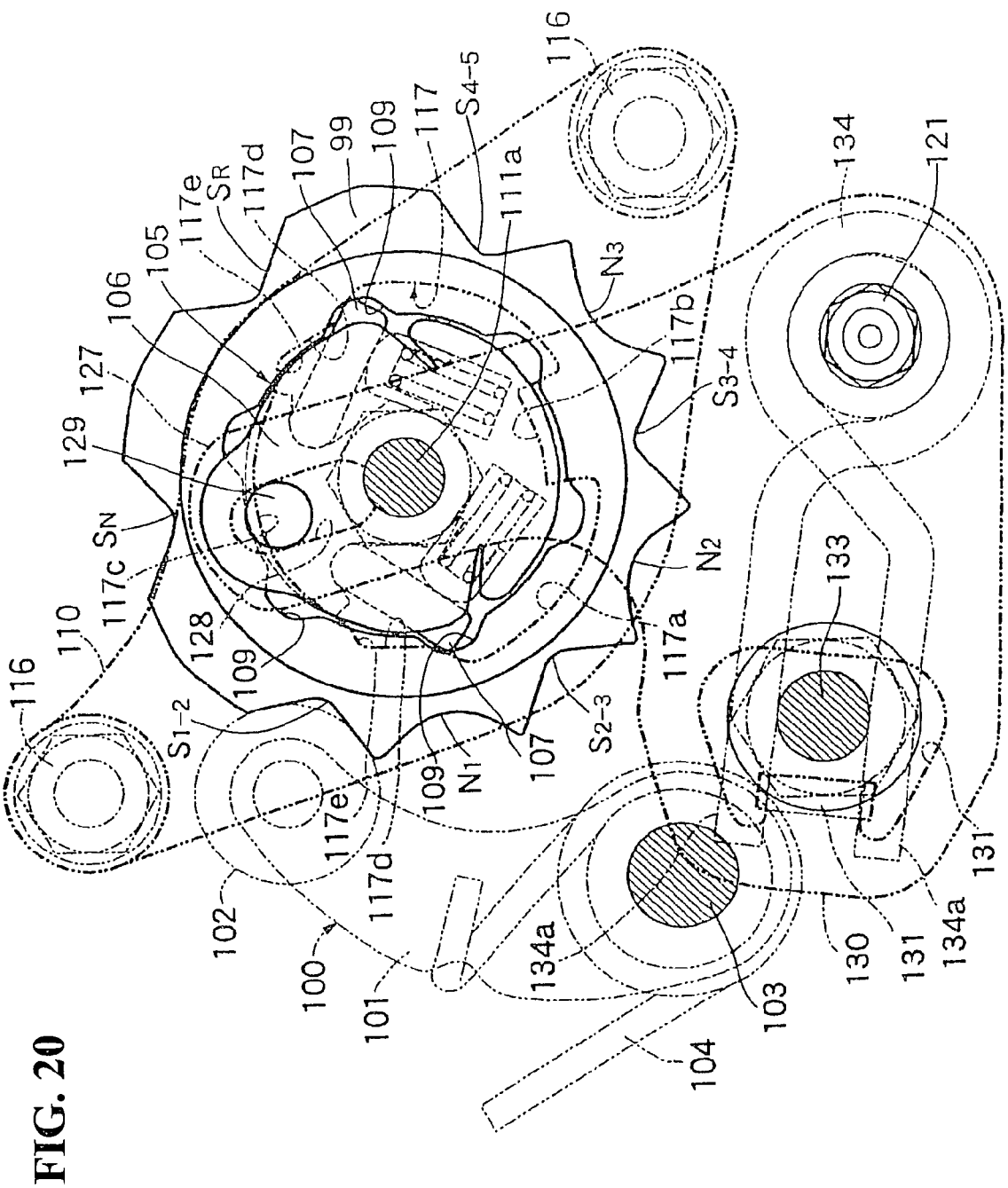
FIG. 20 is a view showing a second embodiment of the present invention, corresponding to FIG. 12.

Referring to FIG. 20 showing a second embodiment of the present invention, of the notches $S_R$, $S_N$, $S_{1-2}$, $S_{2-3}$, $S_{3-4}$, $S_{4-5}$, $N_1$, $N_2$, and $N_3$, the reverse positioning notch $S_R$, the neutral positioning notch $S_N$, the first-second speed positioning notch $S_{1-2}$, the second-third speed positioning notch $S_{2-3}$, the third-fourth speed positioning notch $S_{3-4}$, and the fourth-fifth speed positioning notch $S_{4-5}$ may each be formed into a V-shaped recess, while the neutral notches $N_1$, $N_2$, $N_3$ may each be formed into an arcuate recess.

According to the second embodiment of the present invention, engagement of the drum stopper arm 100 with, and disengagement of the same from, each of the notches $S_R$, $S_N$, $S_{1-2}$, $S_{2-3}$, $S_{3-4}$, and $S_{4-5}$, can be made quickly and the drum stopper arm 100 can be made less easy to leave the neutral notches $N_1$, $N_2$, $N_3$. The engagement state of the drum stopper arm 100 can thereby be maintained for a relatively longer period of time and the neutral state can be maintained for a relatively longer period of time.

It should be understood that the present invention is not limited to the preferred embodiments described heretofore, but also encompasses those changes falling within the spirit and scope of the appended claims.

For example, in the embodiment of the present invention described above, the rotational speed of the shift drum center 99 and the shift drum 95 are made moderate using the rotational resistance of the guide plate 110 of the feed mechanism 105 and that arising from the engagement of the drum stopper arm 100 with the neutral notches $N_1$, $N_2$, $N_3$ disposed on the outer periphery of the shift drum center 99. Such a mechanism and an action are not, however, mandatory requirements for the present invention.

What is claimed is:

1. A vehicular transmission, comprising:
    main shafts, to which power drive from an engine is to be transmitted;
    a countershaft connected to a drive wheel;
    gear trains (G1 to G5) of a plurality of gear positions disposed, to be selectively established, between the main shafts and the countershaft;
    shifters supported unrotatably and slidably on the main shafts or the countershaft to select an established state of the gear trains (G1 to G5);
    a shift drum including a plurality of lead grooves, in which a plurality of shift forks rotatably holding the shifters are engaged, formed on an outer periphery thereof;
    a shift drum center rotatable with the shift drum;

a drum stopper arm urged toward a center of rotation of the shift drum center so as to engage an outer periphery of the shift drum center and thereby determine a position of rotation of the shift drum center; and an intermittent feed mechanism rotatably driving the shift drum center intermittently, the power drive from the engine to the main shafts being shut down when the established state of the gear trains (G1 to G5) is selected;

wherein the shift drum center includes a plurality of gear train establishment notches disposed on the outer periphery of the shift drum center so as to be equally spaced apart from each other, the gear train establishment notches for establishing a specific gear train selected from among the gear trains (G1 to G5) by selectively engaging the drum stopper arm therein; and wherein the shift drum center further includes half neutral notches to be engaged with the drum stopper arm, the half neutral notches being disposed on the outer periphery of the shift drum center and at a central portion between each pair of the gear train establishment notches, respectively.

2. The transmission according to claim 1, wherein the gear train establishment notches are each formed into a V-shaped recess and the half neutral notches are each formed into an arcuate recess.

3. The transmission according to claim 1, wherein the gear train establishment notches are each formed into an arcuate recess and the half neutral notches are each formed into an arcuate recess.

4. The transmission according to claim 1, wherein the gear train establishment notches include a first-second speed positioning notch $S_{1-2}$, a second-third speed positioning notch $S_{2-3}$, a third-fourth speed positioning notch $S_{3-4}$, and a fourth-fifth speed positioning notch $S_{4-5}$.

5. The transmission according to claim 4, wherein the first-second speed positioning notch ($S_{1-2}$) and the fourth-fifth speed positioning notch ($S_{4-5}$) are disposed on diametrically opposite sides of the periphery of the shift drum center.

6. The transmission according to claim 4, wherein the second-third speed positioning notch ($S_{2-3}$) and a reverse positioning notch ($S_R$) are disposed on diametrically opposite sides of the periphery of the shift drum center.

7. The transmission according to claim 4, wherein the third-fourth speed positioning notch ($S_{3-4}$) and a neutral positioning notch ($S_N$) are disposed on diametrically opposite sides of the periphery of the shift drum center.

8. A vehicular transmission, comprising:
first and second main shafts disposed coaxially to permit transmission of power drive from an engine;
a countershaft connected to a drive wheel;
gear trains (G1 to G5) of a plurality of gear positions disposed, to be selectively established, between the first and second main shafts and the countershaft;
shifters supported unrotatably and slidably on at least one of the first main shaft and the countershaft to select an established state of gear trains (G1, G3, G5) disposed between the first main shaft and the countershaft out of the gear trains (G1 to G5) of the plurality of gear positions;
a shift drum including two lead grooves, in which two shift forks rotatably holding the shifters are engaged, formed on an outer periphery thereof;
a shift drum center rotatable with the shift drum;

a drum stopper arm urged toward a center of rotation of the shift drum center so as to engage an outer periphery of the shift drum center and thereby determine a position of rotation of the shift drum center; and an intermittent feed mechanism rotatably driving the shift drum center intermittently, the power drive from the engine to the first main shaft being shut down with the power drive from the engine to the second main shaft transmitted, when the established state of the gear trains (G1, G3, G5) disposed between the first main shaft and the countershaft is selected;

wherein the shift drum center includes a plurality of gear train establishment notches disposed on the outer periphery of the shift drum center so as to be equally spaced apart from each other, the gear train establishment notches for establishing a specific gear train selected from among the gear trains (G1, G3, G5) disposed between the first main shaft and the countershaft; and wherein the shift drum center further includes half neutral notches to be engaged with the drum stopper arm, the half neutral notches being disposed on the outer periphery of the shift drum center and at a central portion between each pair of the gear train establishment notches, respectively.

9. The transmission according to claim 8, wherein the gear train establishment notches are each formed into a V-shaped recess and the half neutral notches are each formed into an arcuate recess.

10. The transmission according to claim 8, wherein the gear train establishment notches are each formed into an arcuate recess and the half neutral notches are each formed into an arcuate recess.

11. The transmission according to claim 8, wherein the gear train establishment notches include a first-second speed positioning notch $S_{1-2}$, a second-third speed positioning notch $S_{2-3}$, a third-fourth speed positioning notch $S_{3-4}$, and a fourth-fifth speed positioning notch $S_{4-5}$.

12. The transmission according to claim 11, wherein the first-second speed positioning notch ($S_{1-2}$) and the fourth-fifth speed positioning notch ($S_{4-5}$) are disposed on diametrically opposite sides of the periphery of the shift drum center.

13. The transmission according to claim 11, wherein the second-third speed positioning notch ($S_{2-3}$) and a reverse positioning notch ($S_R$) are disposed on diametrically opposite sides of the periphery of the shift drum center.

14. The transmission according to claim 11, wherein the third-fourth speed positioning notch ($S_{3-4}$) and a neutral positioning notch ($S_N$) are disposed on diametrically opposite sides of the periphery of the shift drum center.

15. A vehicular transmission, comprising:
first and second main shafts disposed coaxially to permit transmission of power drive from an engine;
a countershaft connected to a drive wheel;
gear trains (G1 to G5) of a plurality of gear positions disposed, to be selectively established, between the first and second main shafts and the countershaft;
a shifter supported unrotatably and slidably on the countershaft to select an established state of gear trains (G2, G4) disposed between the second main shaft and the countershaft out of the gear trains (G1 to G5) of the plurality of gear positions;

a shift drum including a lead groove, in which a shift fork rotatably holding the shifter is engaged, formed on an outer periphery thereof;

a shift drum center rotatable with the shift drum;

a drum stopper arm urged toward a center of rotation of the shift drum center so as to engage an outer periphery of the shift drum center and thereby determine a position of rotation of the shift drum center; and an intermittent feed mechanism rotatably driving the shift drum center intermittently, the power drive from the engine to the second main shaft being shut down with the power drive from the engine to the first main shaft transmitted, when the established state of the gear trains (G2, G4) disposed between the second main shaft and the countershaft is selected;

wherein the shift drum center includes a plurality of gear train establishment notches disposed on the outer periphery of the shift drum center so as to be equally spaced apart from each other, the gear train establishment notches for establishing a specific gear train selected from among the gear trains (G2, G4) disposed between the second main shaft and the countershaft; and wherein the shift drum center further includes a half neutral notch to be engaged with the drum stopper arm, the half neutral notch being disposed on the outer periphery of the shift drum center and at a central portion between the gear train establishment notches.

16. The transmission according to claim 15, wherein the gear train establishment notches are each formed into a V-shaped recess and the half neutral notches are each formed into an arcuate recess.

17. The transmission according to claim 15, wherein the gear train establishment notches are each formed into an arcuate recess and the half neutral notches are each formed into an arcuate recess.

18. The transmission according to claim 15, wherein the gear train establishment notches include a first-second speed positioning notch $S_{1-2}$, a second-third speed positioning notch $S_{2-3}$, a third-fourth speed positioning notch $S_{3-4}$, and a fourth-fifth speed positioning notch $S_{4-5}$.

19. The transmission according to claim 18, wherein the second-third speed positioning notch ($S_{2-3}$) and a reverse positioning notch ($S_R$) are disposed on diametrically opposite sides of the periphery of the shift drum center.

20. The transmission according to claim 18, wherein the third-fourth speed positioning notch ($S_{3-4}$) and a neutral positioning notch ($S_N$) are disposed on diametrically opposite sides of the periphery of the shift drum center.

* * * * *